(12) United States Patent
Benedict et al.

(10) Patent No.: US 12,136,067 B2
(45) Date of Patent: *Nov. 5, 2024

(54) SYSTEMS AND METHODS FOR PROVIDING USER PROFILE SEARCH RESULTS

(71) Applicant: Wells Fargo Bank, N.A., San Francisco, CA (US)

(72) Inventors: Holly Benedict, Davidson, NC (US); Heather Blanchard, Maple Plain, MN (US); Karin Geldfeld, San Francisco, CA (US); Vincent J. Hill, Sr., Harrisburg, PA (US); Ryan McMahon, San Francisco, CA (US); Eric Vanderleek, High Ridge, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/209,406

(22) Filed: Jun. 13, 2023

(65) Prior Publication Data
US 2023/0325779 A1 Oct. 12, 2023

Related U.S. Application Data

(63) Continuation of application No. 17/549,742, filed on Dec. 13, 2021, now Pat. No. 11,720,860, which is a
(Continued)

(51) Int. Cl.
*G06Q 10/1053* (2023.01)
*G06Q 10/0639* (2023.01)
(Continued)

(52) U.S. Cl.
CPC ..... *G06Q 10/1053* (2013.01); *G06Q 10/06398* (2013.01); *G06Q 40/08* (2013.01); *G06Q 50/01* (2013.01)

(58) Field of Classification Search
CPC .......................................... G06Q 10/00–50/00
(Continued)

(56) References Cited

U.S. PATENT DOCUMENTS 6,052,122 A * 4/2000 Sutcliffe ................ G06Q 30/02
707/999.102
6,311,178 B1 * 10/2001 Bi ...................... G06F 16/24578
707/948
(Continued)

FOREIGN PATENT DOCUMENTS

JP 2006-268005 A 10/2006

*Primary Examiner* — Alan S Miller
(74) *Attorney, Agent, or Firm* — Foley & Lardner LLP

(57) ABSTRACT

A system includes a network interface coupled to a network, a profile database coupled to the network interface and configured to store profile information relating to a plurality of users, and at least one processing circuit. The at least one processing circuit is configured to: receive, via the network interface, search criteria from a first device associated with a first user; cause profile information relating to one or more other users based on the search criteria to be transmitted to the first device via the network interface; receive, via the network interface, an indication of a selection of a user of the one or more other users from the first device; monitor and analyze communications between a second device associated with the selected user and the first device; and transmit a message to at least one of the first device or the second device regarding the analyzed communications.

20 Claims, 10 Drawing Sheets

Related U.S. Application Data continuation of application No. 17/020,025, filed on Sep. 14, 2020, now Pat. No. 11,200,541, which is a continuation of application No. 16/035,278, filed on Jul. 13, 2018, now Pat. No. 10,776,758.

(51) Int. Cl.
*G06Q 40/08* (2012.01)
*G06Q 50/00* (2024.01)

(58) Field of Classification Search
USPC ............................. 705/7.11–7.42, 320–322
See application file for complete search history.

(56) References Cited

U.S. PATENT DOCUMENTS

| | | | |
|---|---|---|---|
| 6,401,111 B1* | 6/2002 | Dan ........................ H04L 43/00 | 709/224 |
| 7,043,443 B1* | 5/2006 | Firestone ............... G06Q 30/08 | 705/7.14 |
| 7,167,855 B1* | 1/2007 | Koenig .................... G16Z 99/00 | |
| 7,321,886 B2 | 1/2008 | Swaminathan et al. | |
| 7,752,054 B1* | 7/2010 | Anthony-Hoppe .... G06Q 10/10 | 705/1.1 |
| 7,962,347 B2* | 6/2011 | Anthony-Hoppe .... G06Q 10/10 | 705/1.1 |
| 8,380,709 B1* | 2/2013 | Diller ................ G06F 16/24578 | 707/723 |
| 8,429,092 B2 | 4/2013 | Bekerian et al. | |
| 8,775,418 B2* | 7/2014 | Poon ................... G06F 16/9536 | 707/723 |
| 9,405,807 B2* | 8/2016 | Obernikhin ......... G06F 16/2468 | |
| 2002/0002469 A1* | 1/2002 | Hillstrom ............... G06Q 10/10 | 707/999.107 |
| 2002/0138381 A1* | 9/2002 | Tomecek ............... G06Q 40/02 | 705/36 R |
| 2004/0267595 A1* | 12/2004 | Woodings ...... G06Q 10/063112 | 705/7.14 |
| 2005/0071328 A1* | 3/2005 | Lawrence ........... G06F 16/9535 | |
| 2005/0080657 A1* | 4/2005 | Crow ..................... G06Q 10/10 | 705/7.14 |
| 2005/0182743 A1* | 8/2005 | Koenig .................... G16Z 99/00 | |
| 2005/0240580 A1* | 10/2005 | Zamir ................. G06F 16/9535 | |
| 2006/0129534 A1* | 6/2006 | Jones .................. G06F 16/9535 | |
| 2006/0294138 A1 | 12/2006 | Stolba | |
| 2007/0162507 A1* | 7/2007 | McGovern ............. G06Q 50/01 | |
| 2007/0202484 A1 | 8/2007 | Toombs et al. | |
| 2007/0244734 A1* | 10/2007 | McGovern ............. G06Q 30/08 | 705/321 |
| 2008/0007461 A1 | 1/2008 | Su et al. | |
| 2008/0077461 A1* | 3/2008 | Glick ..................... G06Q 90/00 | 705/7.29 |
| 2009/0089124 A1* | 4/2009 | Henderson ............. G06Q 50/10 | 705/321 |
| 2009/0138317 A1* | 5/2009 | Schoenberg .......... H04L 67/562 | 705/2 |
| 2010/0268669 A1* | 10/2010 | Anthony-Hoppe .... G06Q 40/06 | 705/36 R |
| 2010/0299277 A1 | 11/2010 | Emelo et al. | |
| 2011/0306029 A1 | 12/2011 | Prince | |
| 2014/0222705 A1 | 8/2014 | Aladdin et al. | |
| 2014/0229404 A1* | 8/2014 | Kohl ..................... G06Q 40/08 | 705/36 R |
| 2015/0039525 A1* | 2/2015 | Frazier ................. G06Q 10/105 | 705/319 |
| 2015/0172058 A1* | 6/2015 | Follis .................... H04L 9/3247 | 713/176 |
| 2015/0178682 A1* | 6/2015 | Matthews .......... G06Q 10/1053 | 705/321 |
| 2016/0239558 A1 | 8/2016 | Borenstein | |
| 2017/0004722 A1 | 1/2017 | Dragos | |
| 2017/0076243 A1* | 3/2017 | Noble ............ G06Q 10/063112 | |
| 2017/0109448 A1* | 4/2017 | Adamy ............ G06F 16/24578 | |
| 2017/0148106 A1* | 5/2017 | Kenthapadi ......... G06F 16/9535 | |
| 2018/0039675 A1* | 2/2018 | Gu ...................... G06F 16/2457 | |
| 2023/0325779 A1* | 10/2023 | Benedict ............ G06Q 10/1053 | 705/7.14 |

* cited by examiner

Advisor Team Builder

| Home | My Profile | Search Profiles | My Favorites | | |
|---|---|---|---|---|---|

Update Your Profile

Susan Persona

[ Preview ]  [ Save ]  [ Save & Opt In ]

Contact Information

| | | |
|---|---|---|
| Job Title | PCG Financial Advisor | ☑ Display |
| Sales Title | MD, Investments | ☑ Display |
| Corporate Title | Senior Vice President | ☑ Display |
| State | Michigan | |
| Branch | Bay City | ☑ Display |
| Phone Number | 555-555-5555 | ☐ Display |
| Email Address | susan.persona@email.com | |

Industry Experience

| | | |
|---|---|---|
| T12 Revenue | $500,000 | ☑ Display |
| AUM | $50MM | ☑ Display |
| Firm Employment Length of Service | 27 years, 3 months | ☑ Display |
| Industry Length of Service | 41 years, 8 months | ☑ Display |
| Premier Advisor | Yes | ☑ Display |
| On an Official Team | Yes | ☑ Display |
| Licensed | AL, MI, IL, NC | ☑ Display |
| Securities Registration | AL, MI, IL, NC | ☐ Display |
| Professional Designations | ADPA, BCE | ☐ Display |
| Current # HHS | 210 | ☑ Display |
| Current # HHS > $250,000 | 57 | ☑ Display |
| % of Advisory Business | 28% | ☑ Display |

Professional Summary

| | | |
|---|---|---|
| Strength Finder Themes | -Select- ▼ | ☑ Display |
| DISC Assessment | -Select- ▼ | ☑ Display |
| Goal for forming or enhancing team | -Select- ▼ | ☑ Display |
| Roles within your practice that you enjoy the most | -Select- ▼ | ☑ Display |
| Strengths you bring to a team | -Select- ▼ | ☑ Display |

FIG. 9

SYSTEMS AND METHODS FOR PROVIDING USER PROFILE SEARCH RESULTS

CROSS-REFERENCE TO RELATED PATENT APPLICATIONS

This application is a continuation of U.S. application Ser. No. 17/549,742, filed Dec. 13, 2021, which is a continuation of U.S. application Ser. No. 17/020,025, filed Sep. 14, 2020, which is a continuation of U.S. application Ser. No. 16/035,278, filed Jul. 13, 2018, all of which are incorporated herein by reference in their entireties.

TECHNICAL FIELD

Embodiments of the present disclosure relate generally to the field of electronic tools for aggregating, analyzing, and presenting data relating to matching-making of wealth management professionals.

BACKGROUND

Many senior advisors (SAs) are nearing retirement or otherwise want to leave a professional services advising business (e.g., wealth management, consulting, legal). These SAs typically have established clients that form the basis of an advising practice, many of whom will continue to desire advice after the SA's retirement. To ensure continued client relationships (e.g., to maintain an SA's book of business within an organization/company), an SA may desire to partner with a junior advisor (JA) who is well-suited to transition into the SA's business. JAs often seek such opportunities to gain experience and establish their own practices. Professionals may desire partnerships for other purposes as well, for example to expand a range of services offered or target new demographics of clients. Thus, the creation of new relationships between SAs and JAs is crucial to the future of the advisement industry.

Currently, local in-person networking, social encounters, word of mouth, or generic networking websites (e.g., LinkedIn) provide limited opportunities for the creation of relationships between SAs and JAs. These opportunities are limited geographically and by the scope of one's social interactions and networks. The unsystematic nature of existing SA-JA networking possibilities makes it challenging for any party to organically identify good matches from among many possible relationships, for example because of the limited information shared in most networking situations and the challenge in analyzing and comparing information about multiple potential partners. SAs and JAs therefore often have difficulty in identifying and connecting with counterparts best suited for business partnerships. A need exists for a matchmaking tool that facilitates the creation of mutually-beneficial, unbiased new relationships between SAs and JAs.

SUMMARY

One embodiment of the present disclosure is a system. The system includes a network interface communicably coupled to a network. The system also includes a profile database communicably coupled to the network interface and configured to store profile information relating to a plurality of advisors, and a first circuit communicably coupled to the provider database and the network interface. The first circuit is configured to receive, via the network interface, a search criteria from a first mobile device associated with a first advisor from the plurality of advisors, determine a search result including one or more advisors from the plurality of advisors based on the profile information of the one or more advisors meeting the search criteria, and cause profile information relating to the one or more advisors to be transmitted to the first mobile device via the network interface. The first circuit is further configured to receive, via the network interface, an indication of a selection of an advisor of the one or more advisors from the first mobile device associated with the first advisor, establish a communication session between the first mobile device associated with the first advisor and a second mobile device associated with the selected advisor, monitor and analyze communications between the second mobile device associated with the selected advisor and the first mobile device associated with the first advisor, determine, based on the analyzed communications, one or more terms of a partnership agreement between the first advisor and the selected advisor via an automatic capture of the one or more terms using natural language processing, generate the partnership agreement to formalize a wealth management business relationship between the first advisor and the selected advisor, the partnership agreement including the one or more terms, transmit a first notification to the first mobile device prompting the first advisor to add a first electronic signature to the partnership agreement, and transmit a second notification to the second mobile device prompting the selected advisor to add a second electronic signature to the partnership agreement.

Another embodiment of the present disclosure is a method. The method includes aggregating profile information corresponding to a plurality of advisors, storing the profile information in a profile database, receiving a search criteria from a first mobile device associated with a first advisor from the plurality of advisors, determining a search result comprising one or more advisors from the plurality of advisors based on the profile information of the one or more advisors meeting the search criteria, transmitting profile information corresponding to the one or more advisors to the first mobile device, receiving an indication of a selection of an advisor of the one or more advisors from the first mobile device associated with the first advisor, establishing a communication session between the first mobile device associated with the first advisor and a second mobile device associated with the selected advisor, monitoring and analyzing communications between the second mobile device associated with the selected advisor and the first mobile device associated with the first advisor, determining, based on the analyzed communications, one or more terms of a partnership agreement between the first advisor and the selected advisor, generating the partnership agreement to formalize a wealth management business relationship between the first advisor and the selected advisor, the partnership agreement including the one or more terms, transmitting a first notification to the first mobile device prompting the first advisor to add a first electronic signature to the partnership agreement, and transmitting a second notification to the second mobile device prompting the selected advisor to add a second electronic signature to the partnership agreement.

Another embodiment of the present disclosure is a user device. The user device includes a network interface communicable with a network, an input/output circuit configured to communicate information to a user and receive input from a user; and a processing circuit comprising a processor and memory. The memory is structured to store instructions that are executable by the processor and cause the processing circuit to receive profile information corresponding to a user of the user device. The profile information including demographic information. The instructions are further executable to cause the processing circuit to transmit, via the network interface, the profile information corresponding to the user to a provider computing system, provide, via the input/output circuit, a first graphical user interface having a searchable data field that allows the user to select search criteria, in response to the user selecting a search criteria, transmit, via the network interface, the search criteria to the provider computing system, receive, via the network interface, profile information relating to one or more advisors, the profile information relating to the one or more advisors comprising masked demographic information of the one or more advisors, provide, via the input/output circuit, the profile information relating to the one or more advisors to the user, receive, via the input/output circuit, an indication of a selection of an advisor of the one or more advisors from the user, transmit, via the network interface, the indication of the selection of the advisor to the provider computing system, communicate, via the network interface, with a second user device associated with the selected advisor, analyze the communication between the second user device associated with the selected advisor and the first user device associated with the use, determine, based on the analyzed communication, one or more terms of a partnership agreement between the user and the selected advisor, generate the partnership agreement to formalize a wealth management business relationship between the user and the selected advisor, the partnership agreement including the one or more terms, provide, via the input/output circuit, the partnership agreement to the user, and receive, via the input/output circuit, an electronic signature from the user.

BRIEF DESCRIPTION OF THE DRAWINGS

FIG. 9 is an illustration of a sixth view in a graphical user interface for SA-to-JA matching, according to an example embodiment.

DETAILED DESCRIPTION

Figure 1:
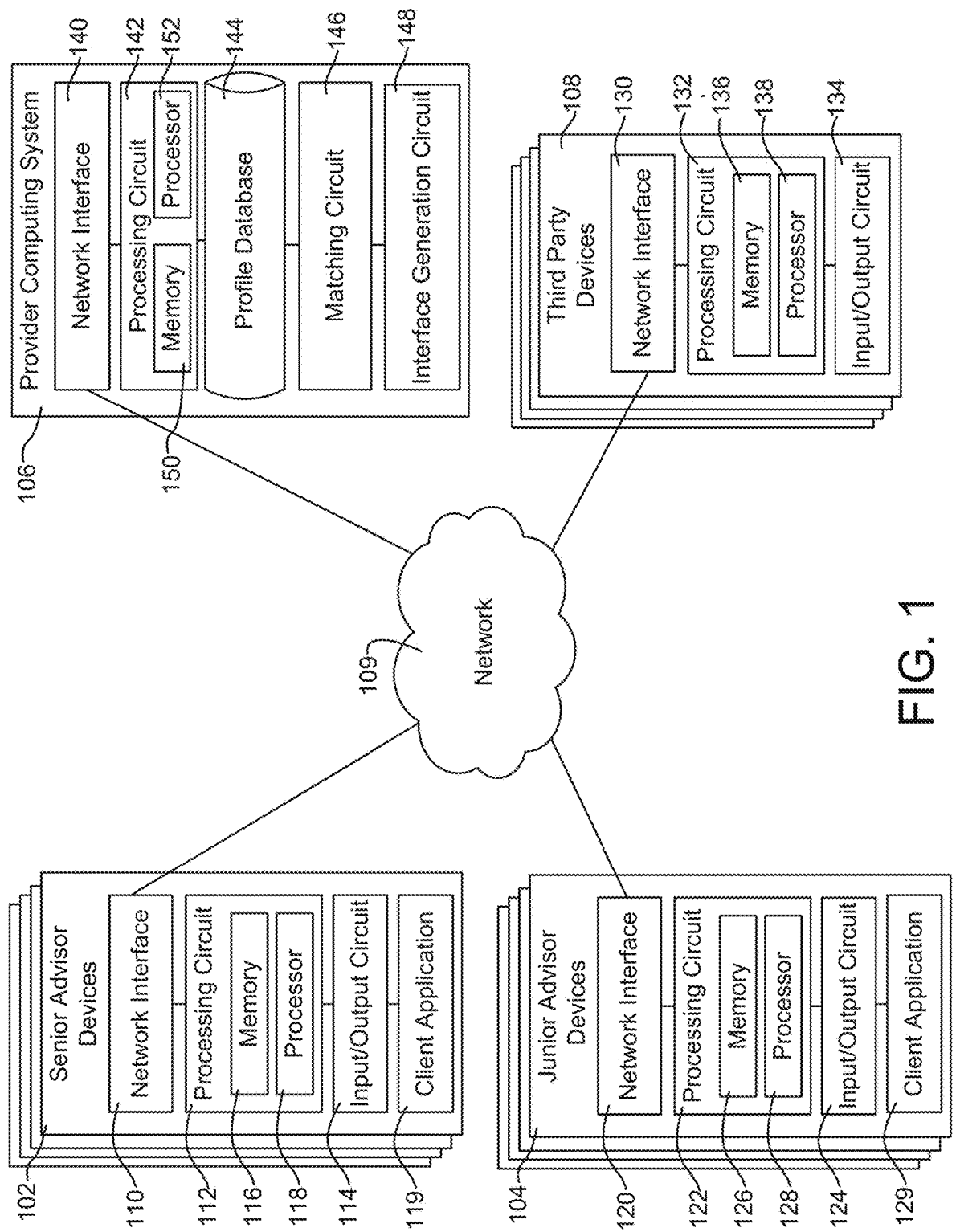
FIG. 1 is a block diagram of a system for SA-to-JA matching, according to an example embodiment.

Referring generally to the Figures, various systems, methods, and apparatuses for facilitating the creation of relationships between senior advisors (SAs) and junior advisors (JAs) are described herein. More particularly, systems, method, and apparatuses for matching SA profiles with JA profiles, facilitating communication between matched SAs and JAs, and allowing for the input of third parties (e.g., human resources professionals) on potential relationships are described herein.

As used herein, the term SA refers any person with an advising business who desires to transition the business to a receiving party, referred to as a JA, or who desires to partner or team with one or more additional advisors (either JAs or SAs) to help grow or otherwise benefit the wealth management business. The terms "senior" and "junior" do not necessarily correlate with the ages of the parties. Although advisors with any type of advising business are contemplated by the present disclosure (e.g., legal, business consulting, engineering consulting, wealth management, accounting, tax planning, social, real estate), the example embodiments described herein are generally targeted at wealth management professionals.

For example, an SA may have a target retirement or business exit date of several years in the future. The SA works for a wealth management company that wants to maintain the SA's clients after the SA's exit from the business. The SA may therefore desire or be encouraged to find a JA to partner with to transition the SA's clients to the JA. Meanwhile, a JA or newcomer to the wealth management industry may be searching for an SA partner to help establish a practice and to gain experience in the industry. The system described herein allows both the SA and JA to opt-in and provide profile information to a SA-JA matchmaking system accessible via electronic devices. From among many SA and JA profiles stored by the matchmaking system, the matchmaking system determines that a particular SA and a particular JA are potentially a good fit for a partnership and presents the match to the SA and JA. If desired by the SA and/or JA, the system can then facilitate communication between the SA and the JA. In some cases, the system also provides profile and match information to a third party who can help to coach the SA and JA as a formal partnership is formed.

The systems, methods, and processes described herein improve upon the SAs' and JAs' existing devices and systems for use with such devices by providing a system, accessible via the devices, that facilitates the establishment of relationships between SAs with JAs based on the likelihood of a mutually-beneficial business partnership. More particularly, as described in detail below, a provider computer system generates a user interface for the input of SA and JA profile information, receives and stores the SA and JA profile information, analyzes the SA and JA profile information to determine matches between SAs and JAs while limiting the effect of bias, allows for the approval or rejection of matches, facilitates communication between mutually-accepted matches, provides for the input of third parties into the relationship creation process, and otherwise facilitates the establishment of a formalized relationship. The efficiency of sorting and analyzing data relating to SAs and JAs by electronic devices such as smartphones and personal computers is thereby substantially improved, as is the predictive accuracy of the results of that sorting and analysis.

Referring now to FIG. 1, a block diagram of a system 100 for SA-to-JA matching is shown, according to an exemplary embodiment. The system 100 includes senior advisor devices (SA devices) 102, junior advisor devices (JA devices) 104, provider computing system 106, third party devices 108, and network 109.

Network 109 provides communicable and operative coupling between the SA devices 102, the JA devices 104, the provider computing system 106, and the third party devices 108. In various embodiments, the network 109 includes any type or types of network, including wired (e.g., Ethernet) and/or wireless networks (e.g., 802.11X, ZigBee, Bluetooth, Internet, Wi-Fi, etc.). In further embodiments, the network 109 includes a proprietary banking network to provide secure or substantially secure communications.

An SA device 102 includes a computing device configured for use by an SA. Accordingly, an SA device 102 may be a mobile device, including one or more of a phone (e.g., a smartphone or other cellular device), a computing device (e.g., a tablet, a portable gaming device, a laptop, a personal digital assistant), a wearable device (e.g., a smart watch, smart glasses, a smart bracelet, a virtual reality or augmented reality headset). In some cases, an SA device 102 may be a desktop computer, a television interface, gaming console, or a voice-activated home assistant. As shown in FIG. 1, the system 100 includes numerous SA devices 102. SA devices 102 in system 100 can be various types of devices (e.g., a first SA device is a smartphone while a second SA device is a desktop computer). In the embodiments described herein, the SA devices 102 are smartphones.

Each SA device 102 is configured to receive information from the provider computing system 106, display a graphical user interface to a SA, receive input from the SA, transmit information to the provider computing system 106, and communicate with one or more JA devices 104 and third party devices 108. Accordingly, each SA device 102 is communicably and operably coupled via network 109 to the JA devices 104, the provider computing system 106, and the third party devices 108. Each SA device 102 includes a network interface 110, a processing circuit 112, an input/output circuit 114, and a client application 119.

Network interface 110 includes program logic that facilitates connection of the SA device 102 to the network 109. Accordingly, the network interface 110 supports communication via the network 109 between the SA device 102, the JA device 104, the provider computing system 106, and third party devices 108. The network interface 110 may include a cable modem, a broadband modem, a cellular modem, a Bluetooth transceiver, a Bluetooth beacon, a radio-frequency identification (RFID) transceiver, and/or a near-field communication (NFC) transmitter. In some embodiments, the network interface 110 includes cryptography capabilities to establish a secure or relatively secure communication session.

The processing circuit 112 is configured to control, at least partly, the SA device 102 as described herein. The processing circuit 112 includes memory 116 and processor 118. The processor 118 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices of memory 116 (e.g., RAM, ROM, NVRAM, Flash Memory, hard disk storage, etc.) may store data and/or computer code for facilitating at least some of the various processes described herein. In this regard, the memory 116 may store programming logic that, when executed by the processor 118, controls the operation of the SA device 102.

The input/output circuit 114 is structured to exchange (e.g., receive and provide) communication(s) with a user of the SA device 102. For example, an SA providing profile information and a response from the SA device 102 showing identified JA matches may be accomplished using the input/output circuit 114. In this regard, the input/output circuit 114 is structured to exchange data, signals, values, communications, instructions, etc. with input/output components of the SA device 102. The input/output circuit, according to various embodiments, may include a touch-screen display, a monitor, a keyboard, a mouse, a speaker, and/or a microphone. For example, the input/output circuit 114 includes a display configured to display graphical user interfaces generated by the provider computing system 106. The input/output circuit 114 also includes any combination of hardware components, communication circuitry, and machine-readable media for facilitating the exchange of information between the input/output components and elements of the SA device 102, including the processing circuit 112 and the network interface 110.

According to various embodiments, the client application 119 may provide some or all of the functions attributed herein to the provider computing system 106. According to various embodiments, the client application 119 includes a server-based application executable by the processing circuit 112 (e.g., such that the client application 119 must be downloaded prior to usage), a web-based interface application accessible via a browser, and/or its own set of dedicated or substantially dedicated hardware components and associated logic. All such variations and combinations are intended to fall within the scope of the present disclosure.

A JA device 104 includes a computing device configured for use by an JA. Accordingly, a JA device 104 may be a mobile device, including one or more of a phone (e.g., a smartphone or other cellular device), a computing device (e.g., a tablet, a portable gaming device, a laptop, a personal digital assistant), a wearable device (e.g., a smart watch, smart glasses, a smart bracelet, a virtual reality or augmented reality headset). In some cases, a JA device 104 may be a desktop computer, a television interface, or a voice-activated home assistant. As shown in FIG. 1, the system 100 includes numerous JA devices 104. Various JA devices 104 in system 100 can be various types of devices (e.g., a first JA device is a smartphone while a second JA device is a desktop computer). In the embodiments described herein, each JA device 104 is a smartphone.

Each JA device 104 is configured to be used by a JA to view graphical user interfaces generated by the provider computing system 106, accept input relating to the graphical user interfaces, transmit the input to the provider computing system 106, and communicate with one or more SA devices 102 and third party devices 108. Accordingly, each JA device 104 is communicably and operably coupled via network 109 to the provider computing system 106, the SA devices 102, and the third party devices 108. Each JA device 104 includes a network interface 120, a processing circuit 122, an input/output circuit 124, and a client application 129.

Network interface 120 includes program logic that facilitates connection of the JA device 104 to the network 109. Accordingly, the network interface 120 supports communication via the network 109 between the SA device 102, the JA device 104, the provider computing system 106, and third party devices 108. The network interface 120 may include a cable modem, a broadband modem, a cellular modem, a Bluetooth transceiver, a Bluetooth beacon, a radio-frequency identification (RFID) transceiver, and/or a near-field communication (NFC) transmitter. In some embodiments, the network interface 120 includes cryptography capabilities to establish a secure or relatively secure communication session.

The processing circuit 122 is configured to control, at least partly, the JA device 104 as described herein. The processing circuit 122 includes memory 126 and processor 128. The processor 128 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices of memory 126 (e.g., RAM, ROM, NVRAM, Flash Memory, hard disk storage, etc.) may store data and/or computer code for facilitating at least some of the various processes described herein. In this regard, the memory 126 may store programming logic that, when executed by the processor 128, controls the operation of the JA device 104.

The input/output circuit 124 is structured to exchange (e.g., receive from and provide to) communication(s) with a user of the JA device 104. For example, a JA providing profile information and a response from the JA device 104 showing identified SA matches may be accomplished using the input/output circuit 124. In this regard, the input/output circuit 124 is structured to exchange data, signals, values, communications, instructions, etc. with input/output components of the JA device 104. The input/output circuit, according to various embodiments, may include a touch-screen display, a monitor, a keyboard, a mouse, a speaker, and/or a microphone. For example, the input/output circuit 124 includes a display configured to display graphical user interfaces generated by the provider computing system 106. The input/output circuit 124 also includes any combination of hardware components, communication circuitry, and machine-readable media for facilitating the exchange of information between the input/output components and elements of the JA device 104, including the processing circuit 122 and the network interface 120.

According to various embodiments, the client application 129 may provide some or all of the functions attributed herein to the provider computing system 106. According to various embodiments, the client application 129 includes a server-based application executable by the processing circuit 122 (e.g., such that the client application 129 must be downloaded prior to usage), a web-based interface application accessible via a browser, and/or its own set of dedicated or substantially dedicated hardware components and associated logic. All such variations and combinations are intended to fall within the scope of the present disclosure.

An third party device 108 includes a computing device configured for use by a third party (e.g., a human resources professional). Accordingly, a third party device 108 may be a mobile device, including one or more of a phone (e.g., a smartphone or other cellular device), a computing device (e.g., a tablet, a portable gaming device, a laptop, a personal digital assistant), a wearable device (e.g., a smart watch, smart glasses, a smart bracelet, a virtual reality or augmented reality headset). In some cases, a third party device 108 may be a desktop computer, a television interface, or a voice-activated home assistant. As shown in FIG. 1, the system 100 includes numerous third party devices 108. Various third party devices 108 in system 100 can be various types of devices (e.g., a first third party device is a smartphone while a second third party device is a desktop computer). In the embodiments described herein, the third party device 108 is a desktop computer.

Each third party device 108 is configured for use by a third party to view graphical user interfaces generated by the provider computing system 106, accept input relating to the graphical user interfaces, transmit the input to the provider computing system 106, and communicate with one or more SA devices 102 and JA devices 104. Accordingly, each third party device 108 is communicably and operably coupled via network 109 to the provider computing system 106, SA devices 102, and JA devices 104. Each third party device 108 includes a network interface 130, a processing circuit 132, and an input/output circuit 134.

Network interface 130 includes program logic that facilitates connection of the third party device 108 to the network 109. Accordingly, the network interface 130 supports communication via the network 109 between the SA device 102, the JA device 104, the provider computing system 106, and third party devices 108. The network interface 130 may include a cable modem, a broadband modem, a cellular modem, a Bluetooth transceiver, a Bluetooth beacon, a radio-frequency identification (RFID) transceiver, and/or a near-field communication (NFC) transmitter. In some embodiments, the network interface 130 includes cryptography capabilities to establish a secure or relatively secure communication session.

The processing circuit 132 is configured to control, at least partly, the third party device 108 as described herein. The processing circuit 132 includes memory 136 and processor 138. The processor 138 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices of memory 136 (e.g., RAM, ROM, NVRAM, Flash Memory, hard disk storage, etc.) may store data and/or computer code for facilitating at least some of the various processes described herein. In this regard, the memory 136 may store programming logic that, when executed by the processor 138, controls the operation of the third party device 108.

The input/output circuit 134 is structured to exchange (e.g., receive and provide) communication(s) with a user of the third party device 108. For example, a communication of a potential SA-to-JA match to a third party and a response from the third party indicating an opinion about the match may be accomplished using the input/output circuit 134. In this regard, the input/output circuit 134 is structured to exchange data, communications, instructions, etc. with input/output components of the third party device 108. The input/output circuit 134, according to various embodiments, may include a touch-screen display, a monitor, a keyboard, a mouse, a speaker, and/or a microphone. For example, the input/output circuit 134 includes a display configured to display graphical user interfaces generated by the provider computing system 106. The input/output circuit 134 also includes any combination of hardware components, communication circuitry, and machine-readable media for facilitating the exchange of information between the input/output components and elements of the third party device 108, including the processing circuit 132 and the network interface 130.

The provider computing system 106 is configured to generate graphical user interfaces relating to SA-JA matching, receive profile information relating to SAs and JAs, store profile information, analyze profile information to determine matches between SAs and JAs, facilitate communication between SAs, JAs, third parties, and otherwise contribute to the establishment of new SA-JA relationships as described herein. Accordingly, the provider computing system 106 is communicably and operably coupled via network 109 with the SA devices 102, JA devices 104, and third party devices 108. The provider computing system 106 includes a network interface 140, a processing circuit 142, a profile database 144, a matching circuit 146, and an interface generation circuit 148.

Network interface 140 includes program logic that facilitates connection of the provider computing system 106 to the network 109. Accordingly, the network interface 140 supports communication via the network 109 between the SA device 102, the JA device 104, the provider computing system 106, and third party devices 108. The network interface 140 may include a cable modem, a broadband modem, a cellular modem, a Bluetooth transceiver, a Bluetooth beacon, a radio-frequency identification (RFID) transceiver, and/or a near-field communication (NFC) transmitter. In some embodiments, the network interface 140 includes cryptography capabilities to establish a secure or relatively secure communication session.

The processing circuit 142 is configured to control, at least in part, the provider computing system 106 as described herein. The processing circuit 142 includes memory 150 and processor 152. The processor 152 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices of memory 150 (e.g., RAM, ROM, NVRAM, Flash Memory, hard disk storage, etc.) may store data and/or computer code for facilitating at least some of the various processes described herein. In this regard, the memory 150 may store programming logic that, when executed by the processor 152, controls the operation of the provider computing system 106

The interface generation circuit 148 is configured to generate graphical user interfaces as needed to carry out the functions of the system 100. The graphical user interfaces generated by the interface generation circuit 148 are transmitted via network interface 140 and network 109 to the SA devices 102, JA devices 104, and third party devices 108 via network 109, for display with various output components of the input/output circuits 114, 124, 134. For example, as discussed in detail with reference to FIG. 2, the interface generation circuit 148 generates graphical user interfaces that prompt the entry of SA and JA profile information, provide SAs with information about matched JAs, provide JAs with information about matched SAs, provide options to accept matches, and provide information about accepted matches to third parties, among other possible graphical user interfaces. Accordingly, the interface generation circuit 148 is communicably and operably coupled to the matching circuit 146, the profile database 144, the processing circuit 142, and the network interface 140 to receive requests to generate graphical user interfaces, to obtain information for inclusion in graphical user interfaces, and to cause the generated graphical user interfaces to be transmitted to one or more desired devices of the SA devices 102, JA devices 104, and third party devices 108.

The profile database 144 stores profile information relating to SAs and JAs. Profile information includes values for each SA and JA corresponding to a plurality of data fields. Each value indicates a trait/characteristic/fact/etc. about an SA or JA for a particular data field. Data fields fall into several categories, including personal information, resume/background information, business/client information, personality information, and goals/desires. Personal information data fields may include a name, age, location, phone number, email address, etc. Resume/background data fields may include education level, schools attended, grades, degrees attained, certifications, licenses, registrations, professional designations, job title/level, duration of time in industry, duration of time at current job, etc. Business/client information may include revenue generated, assets under management (AUM), number of clients, number of clients in particular categories, client identities, categories of work performed, specialties, favorite tasks/types of work, client locations, common client traits (e.g., most clients are pro athletes, most clients like to network on golf course), etc. Personality information data fields may include personality test results, hobbies, interests, political leanings, management style, desired workplace culture, etc. Goals/desires data fields include reasons for seeking a partner/teammate, retirement timeline, skills/traits/other data field values desired in a partner/teammate, desired directions of business expansion, personal/family goals, work-life balance goals, career goals, etc. Profile information corresponding to each SA and JA includes a value for some or all of the data fields, so that the SAs' and JAs' characteristics/traits/etc. corresponding to the data fields are captured in the profile information. For example, the location data field for an SA in San Francisco is filled by a value "San Francisco" in the profile information corresponding to that SA (the "SA's profile"). A profile for each SA and JA is stored in the profile database 144 with consistent data fields to facilitate comparison, searching, and analysis of profiles including the operation of a matching algorithm.

In some embodiments, profile information includes JA and SA demographic information (e.g., age, race, gender, religion) which may be used to counter implicit or explicit biases or systemic inequalities. In other embodiments, potentially-biasing information such as age, race, religion, or gender is removed or masked to help counter bias. In some embodiments, the profile database 144 also stores history of matches, approved matches, declined matches, and other system usage data.

In some embodiments, profile information (i.e., values for the data fields described above) is received by the profile database 144 from the SA devices 102 and the JA devices 104 as input by SAs and JAs via input/output circuits 114, 124. In such embodiments, the interface generation circuit 148 is configured to generate a graphical user interface to prompt and accept the input of profile information. The graphical user interface may include an entry tool for each data field, for example a free-form text box, a drop-down menu of options, a date picker. In some embodiments, the provider computing system 106 is communicable via network 109 with one or more additional profile information sources (e.g., social media platforms, networking platforms, wealth management firm websites, service review websites, news sources, wealth management firm computing systems) to locate, aggregate, and store additional profile information in the profile database 144. The provider computing system 106 can thereby auto-populate some data fields based on information available via the internet or in other electronic sources.

In various embodiments, some or all of the profile information is imported from a wealth management professional information system, for example personnel files or other electronic records of a wealth management company. The information on this system may be curated and managed by staff at the wealth management company and/or populated based on business management or accounting software (e.g., an SA's assets under management value may be sourced from a software program and database that the SA uses to manage the assets). In such a case, users may be prevented from editing some or all data fields to ensure that the information remains accurate, to ensure entries in data fields are consistently coded (i.e., ensuring that a characteristic or trait means the same thing across all profiles), and to limit user errors. In some cases, a set of objective data fields are locked from editing by the SA or JA (e.g., assets under management, number of clients, years in the business, degrees received) while subjective data fields are open to editing (e.g., career goals, work-life balance goals, personal interests, perceived strengths/specialties, reasons for seeking a partner/teammate). A user interface may be generated by the interface generation circuit 148 to prompt a user to select which data fields will or will not be included in a profile for that user as used by the matching circuit 146 and/or for other functions of the provider computing system 106. Auto-populating profile information may increase usability, reduce onboarding times, increase the amount of profile information in the profile database 144, and thereby increase the user base and thus the usefulness of the provider computing system.

The profile database 144 also stores a list of third parties (e.g., human resources professionals) that use third party devices 110 who are skilled in managing and developing new relationships between wealth management professionals. For each third party, the profile database 144 may store third party profile information including a third party's location, contact information, area of expertise, particular skills, availability, and other information relevant to matching a third party to a nascent relationship between SAs and JAs.

The matching circuit 146 is configured to determine matches between SAs and JAs based on the profile information stored in the profile database 144, receive approvals and disapprovals of matches, and generate formal partnership agreements. Accordingly, the matching circuit 146 is communicably and operably coupled to the profile database 144 to access profile information and to the interface generation circuit 148 to instruct the interface generation circuit to generate graphical user interfaces that communicate matches to SAs and JAs and prompt selection of an approval or disapproval option.

A "match" refers to a determination that a particular JA is a good fit or likely a good fit for a partnership with a particular SA and vice versa (i.e., that the particular SA is a good fit for a partnership with the particular JA). The matching circuit 146 determines matches using a matching algorithm to determine the matches. According to various embodiments, the matching algorithm includes any type or combination of information processing approaches, including rules-based computer logic, artificial intelligence, neural networks, machine learning, etc. In some embodiments, the matching circuit 146 determines a probability that a wealth management business or other advisement business of an SA will benefit from a partnership with the particular JA (and vice versa). The matching circuit 146 may then determine a match if the probability for the pair of advisors exceeds a threshold probability (e.g., 30%, 50%, 80%, 90%). In some embodiments, probability is correlated with some other metric (e.g., a compatibility score), and the threshold probability corresponds to a threshold value of that other metric.

The matching algorithm considers any or all of the profile information stored in the profile database 144. For example, according to various embodiments, the matching algorithm includes comparison of JA and SA interests and hobbies (e.g., so the JA and SA can bond by playing golf and talking about classic rock), JA hobbies and the SA's client's hobbies (e.g., so the JA is suited to continue the SA's practice of golfing with clients), JA and SA personality traits (e.g., complementary personalities that will work well together), business skills/backgrounds (e.g., JA and SA have similar educational backgrounds and certifications such that the JA is suited to the SA's existing practice; JA has different skills than the SA that can complement and grow the SA's exiting practice), and/or other types of personality information to determine positive indications of a potential successful relationship. The matching algorithm also avoids negative indications (e.g., outspoken and opposing political views, clashing personality types, conflicting business philosophies). In some embodiments, the matching algorithm includes a weighting approach that allows a SA and/or JA to indicate which types of profile information the SA or JA considers most important and prioritizes that type of information accordingly. The matching algorithm may follow a data-driven neural network, machine learning, or artificial intelligence approach, such that the matching algorithm cannot be expressed in logical (i.e., if-then) or mathematical statements.

In some embodiments, the matching algorithm is configured to avoid or minimize the effects of explicit, implicit, and/or systemic biases to provide a fair, unbiased matching process. For example, the matching circuit 146 may preprocess profile information to remove, hide, mask, alter, or otherwise minimize the effects of bias (e.g., by hiding names, ages, genders, sexual orientations, disabilities, etc.) so that that demographic/sensitive information is not included in the matching process. Because many relevant considerations for the matching algorithm correlate with sensitive categories (e.g., old white male SAs are likely to have particular hobbies, while young minority female JAs may be likely to have different hobbies), in some embodiments the matching algorithm includes a balancing approach that seeks to optimize the predictive strength of matches while also avoiding the reinforcement of systemic inequalities.

Figure 6A:
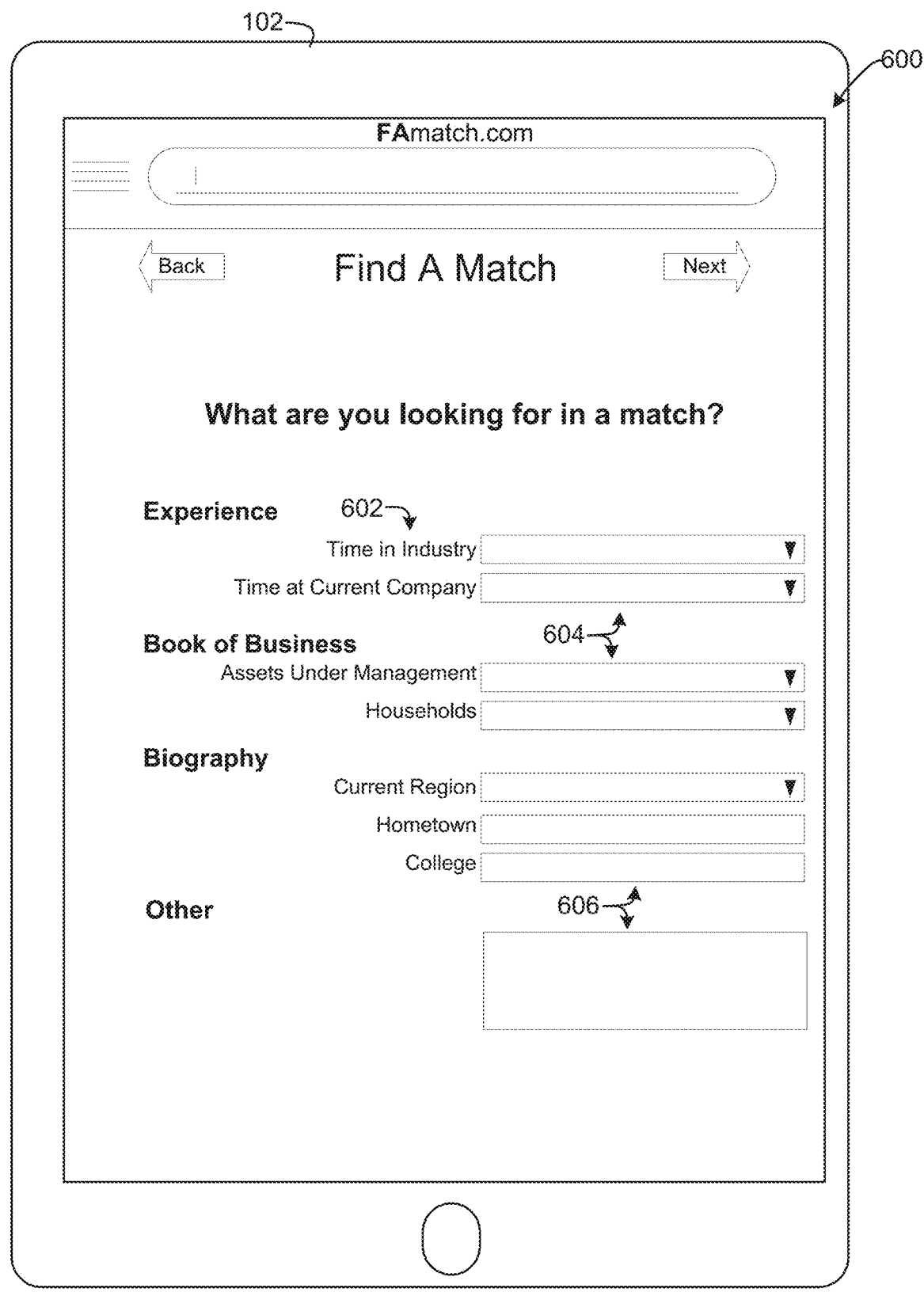
FIG. 6A an illustration of a second view in a graphical user interface for SA-to-JA matching, according to an example embodiment.
Figure 6B:
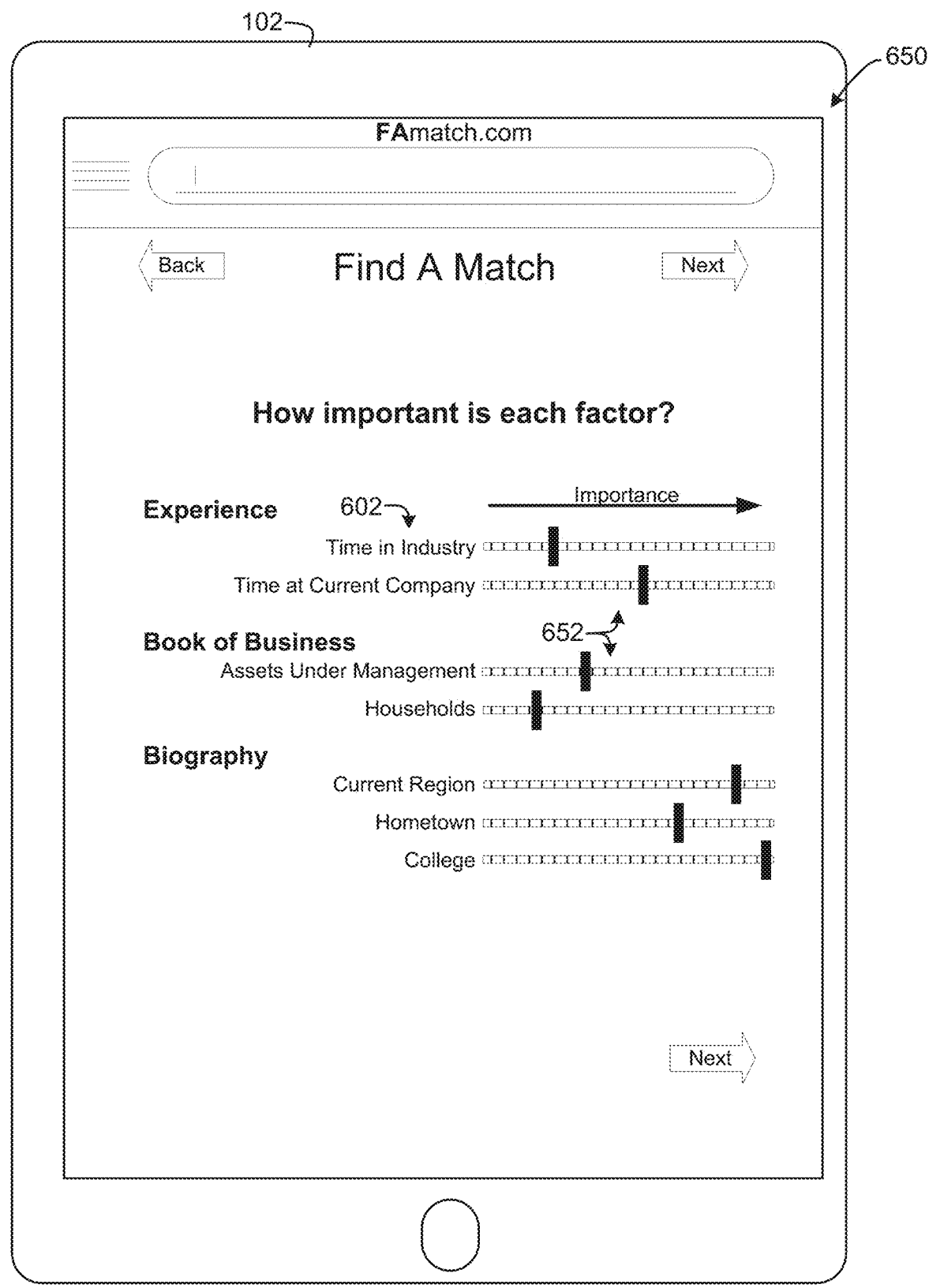
FIG. 6B an illustration of a third view in a graphical user interface for SA-to-JA matching, according to an example embodiment.

In some embodiments, the matching algorithm may be expressed in the following notation:

$$\text{compatibility score} = \frac{1}{N}\sum_{i=1}^{N} w_i X_i$$

where N is the number of categories of profile information (e.g., age, geography, book of business size, hobbies) analyzed by the algorithm, the index i indicates a particular category of profile information, $X_i$ is a category score that quantifies how well the SA and JA match for a category of information i, and $w_i$ is a weighting factor specific to that category of information. The values of $X_i$ may be binary (e.g., either one or zero) and may be determined by the matching circuit 146. The weighting factors $w_i$ may be chosen by an SA or JA, such that the SA or JA may determine which category or categories of information are most influential in the matching algorithm. For example, an SA who prioritizes geographic proximity over other factors may set the weighting factor for geography high while setting other weighting factors low. An example of a graphical user interface that allows the user to choose these weights is shown in FIG. 6B. The matching circuit 146 may determine that an SA and JA match if the compatibility score is greater than a threshold value.

In some embodiments, the matching algorithm reduces the effects of bias using the weighting factors. For example, to counter a systemic bias tied to geographic location, the matching algorithm may set a relatively low maximum value on the weighting factor for a geography information category. The matching circuit may also increase the value of other weighting factors to decrease the relative importance of information associated with one or more biases in determining compatibility. The matching circuit may override weighting preferences of a user to combat bias.

When the matching circuit 146 determines a match, the matching circuit 146 is further configured to provide the match to the interface generation circuit 148 and instruct the interface generation circuit 148 to generate graphical user interfaces that communicate the match to the SA and the JA. The matching circuit 146 may select a type of notification for the SA and/or JA based on the value of the matching algorithm $$\left(\text{i.e., the value of compatibility score} = \frac{1}{N}\sum_{i=1}^{N} w_i X_i\right).$$

In a first range, the matching circuit 146 may determine that the match should be added to a list accessible on demand by an SA or JA. In a higher range, the matching circuit 146 may determine that an email should be sent to the SA device 102 or JA device 104. At even higher values, the matching circuit 146 may determine that a push notification should be sent to and displayed on the SA device 102 or JA device 104, for example accompanied by a noise or vibration form the SA device 102 and JA device 104.

According to various embodiments, the matching circuit 146 selects relevant profile information for the SA and JA and provides the relevant profile information to the interface generation circuit 148 for inclusion in the graphical user interfaces. The relevant profile information may be chosen so as to reveal the reasons for the match (e.g., complementary personalities, common hobbies, well-fitting business skills), while hiding sources of potential bias (e.g., names, genders, photographs, ages). In addition to the relevant profile information, the graphical user interfaces also include an option to approve or decline the identified match.

The matching circuit 146 is further configured to receive indications from the matched SAs and JAs of approval or disapproval of matches. When a match is disapproved by an SA or JA, the matching circuit 146 generates another match to provide to the SA and/or JA. If a match is approved by the SA or JA, the matching circuit checks whether the match has been approved by the matched party (i.e., when an SA approves a matched JA, the matching circuit checks whether the matched JA has approved the SA and when a JA approves a matched SA, the matching circuit checks whether the matched SA has approved the SA). In some arrangements, history of matches, approvals, and denials are stored in the profile database 144 to facilitate this process. Historical matches, approvals, and denials may also be used to improve the matching algorithm. For example, if a particular SA repeatedly rejects JAs with a particular trait, the matching algorithm may learn to stop matching that SA with JAs with that trait.

If the matching circuit 146 determines that both parties to a match (i.e., an SA and a JA) have approved the match, the matching circuit 146 is configured to facilitate communication between the SA and the JA. In some embodiments, the matching circuit 146 establishes and hosts a chat session between the SA device 102 and the JA device 104. The chat session may be arranged to obscure both parties' race, gender, age, etc. to avoid potential biases. In some embodiments, the matching circuit looks up contact information (e.g., phone number, email address) for the SA and JA in the profile database and provides the contact information to the interface generation circuit 148 to be included in a graphical user interface provided on the SA devices 102 and JA devices 104. In some embodiments, the matching circuit 146 may automatically schedule or suggest an in-person meeting between the SA and JA, for example based on interests or preferences stored in the profile database 144 (e.g., the matching circuit 146 may suggest that the SA and JA meet at a particular brewery at a certain time based on a shared interest in beer determined from profile information). The matching circuit 146 thereby facilitates an initial communication between an SA and JA where the SA and the JA can discuss their goals, desires about a potential partnership, and judge personal and business compatibility. The initial communication phase can last any amount of time, and may end with an indication to the provider computing system 106 via SA device 102 and JA device 104 that the SA and JA want to move forward with relationship development or want to end the nascent relationship.

The matching circuit 146 is configured to receive the indication that the matched SA and JA want to move forward with formalizing the relationship. In response to such an indication, the matching circuit 146 is configured to determine a third party that can assist in relationship formation, initiate the provision of SA and JA profile information to the third party, and facilitate communication between the SA, the JA, and the third party. The matching circuit 146 accesses third party profiles in the profile database 144 that indicate the types of relationships that each third party is skilled at developing. For example, a first third party has expertise in retirement transition relationships, while another third party has expertise in new relationships targeting business expansion. The matching circuit 146 determines the type of the relationship sought by the matched SA and JA and identifies a third party skilled in handling that type of relationship. The matching circuit 146 then provides relevant relationship, SA, and JA information to the interface generation circuit 148 and instructs the interface generation circuit 148 to generate a graphical user interface to transmit to a third party device 108 to provide the identified third party with the relevant relationship, SA, and JA information. The matching circuit 146 allows the third party to review the information and then facilitates communication between the SA, the JA, and the third party.

In some embodiments, the matching circuit is further configured to auto-generate a draft partnership agreement to formalize a new relationship between the SA and JA. The draft partnership agreement may be based on form documents, profile information in the profile database 528, and other inputs from the SA, JA, and third party made via SA devices 102, JA devices 104, and third party devices 108. The provider computing system thereby facilitates the entire process of relationship creation from initial identification of matches to formal partnership establishment.

In various embodiments, additionally or alternatively to automate matching using a matching algorithm, the provider computing system 106 facilitates searching for SA and/or JA profiles based on specific search criteria corresponding to the data fields of the profile information. In these embodiments, the interface generation circuit 148 generates a graphical user interface that allows a user to enter a desired value or set/range of values for some or all data fields used in the profile information. These desired values define search criteria which are received by the matching circuit 146. The matching circuit is configured to determine the profiles in the profile database 144 for which the profile meets the search criteria (i.e., for which the values for the data fields in the profile match the values for those data fields in the search criteria as indicated by the user). The matching circuit is further configured to provide the matching profiles to the interface generation circuit 148. The interface generation circuit 148 is configured to generate a graphical user interface that includes a list of the matching profiles (i.e., the search results).

Figure 2:
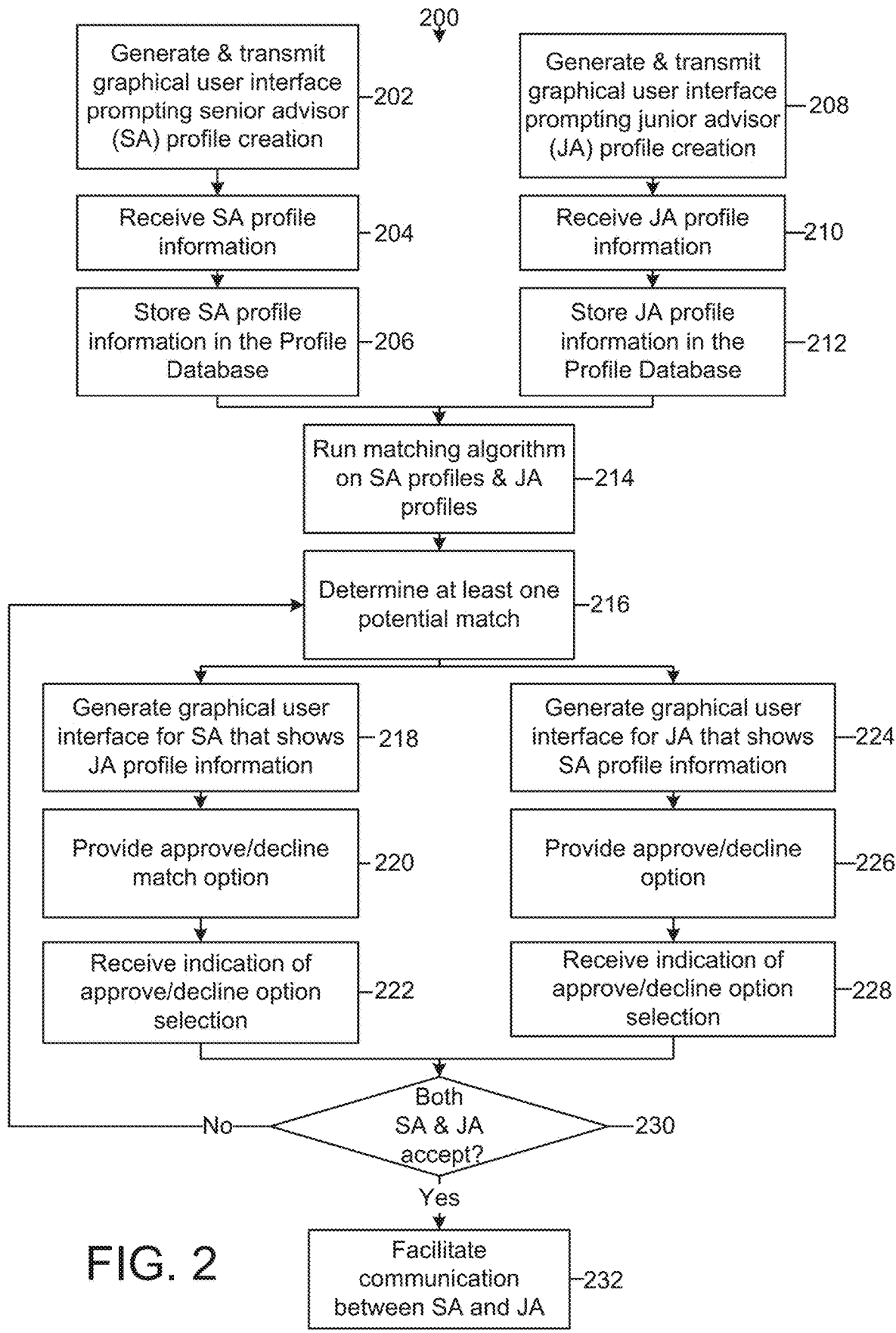
FIG. 2 is a flow chart of a process for initiating relationships between SAs and JAs with the system of FIG. 1, according to an example embodiment.

Referring now to FIG. 2, a process 200 for facilitating the creation of new relationships between SAs and JAs is shown, according to an exemplary embodiment. Process 200 can be carried out by the provider computing system 106 in communication with other elements of system 100. Accordingly, for the sake of clarity, reference is made to elements of system 100 in the following description of process 200.

Figure 5:
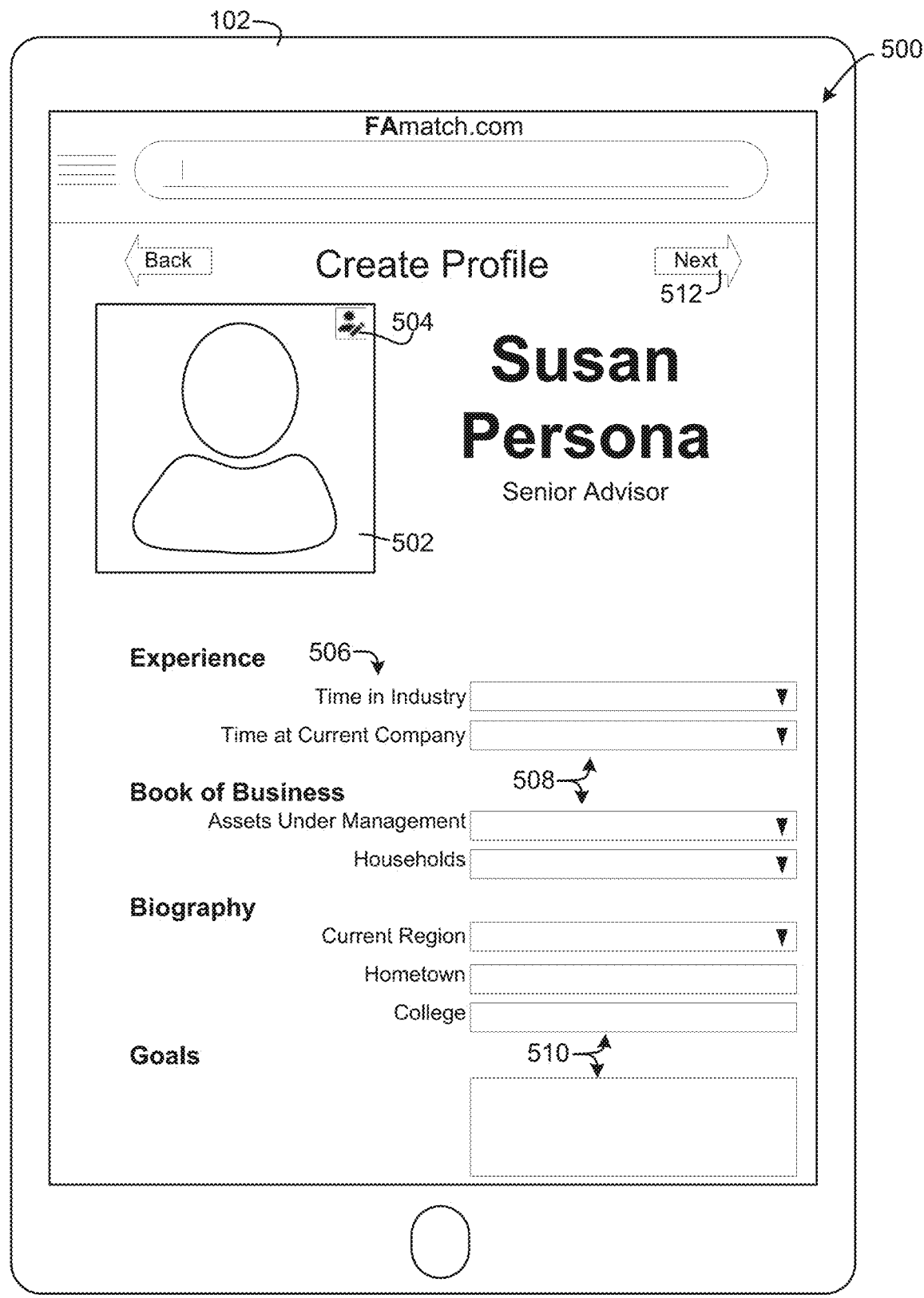
FIG. 5 is an illustration of a first view in a graphical user interface for SA-to-JA matching, according to an example embodiment.

At step 202, the interface generation circuit 148 generates a graphical user interface that prompts a SA to create a profile and causes the graphical user interface to be transmitted to one or more SA devices 102. Examples of such a graphical user interface are shown in FIGS. 5-6 and 9 and described in detail below with reference thereto. In general, the graphical user interface generated and transmitted at step 202 prompts a SA to opt-in to the matchmaking process, provide values for data fields to provide profile information about the SA, and provide an indication of what the SA is looking for in a JA. The graphical user interface is presented on an SA device 102, and an SA can enter profile information and an opt-in selection using the SA device 102.

At step 204, the provider computing system 106 receives the SA profile information. The SA profile information is received from a SA device 102 by the processing circuit 142 via network interface 140 and network 109. At step 206, the processing circuit 142 stores the SA profile information in the profile database 144.

At step 208, the interface generation circuit 148 generates a graphical user interface that prompts a JA to create a profile and causes the graphical user interface to be transmitted to one or more JA devices 104. Examples of such a graphical user interface are shown in FIGS. 5-6 and 9 and described in detail below with reference thereto. In general, the graphical user interface generated and transmitted at step 202 prompts a JA to opt-in to the matchmaking process, provide values for data fields to provide profile information about the JA, and provide an indication of what the JA is looking for in an SA. The graphical user interface is presented on an SA device 102, and a user can enter profile information and an opt-in selection using the SA device 102.

At step 210, the provider computer system 106 receives the JA profile information. The JA profile information is received from a SA device 102 by the processing circuit 142 via network interface 140 and network 109. At step 212, the processing circuit 142 stores the JA profile information in the profile database 144.

At step 214, the matching circuit 146 runs matching algorithms on the SA and JA profile information stored in the profile database 144. As described above with reference to FIG. 1, the matching circuit 146 may use some or all of the SA and JA profile information to analyze which SAs and JAs could fit well together for a successful business partnership. In various embodiments, the matching algorithm uses any consideration of any combination of data fields using predetermined or machine-determinable relationships between values in particular data fields and success of matched pairs, for example determined by collecting data on a large number of past/current relationships and using that data to determine data patterns associated with successful relationships. For example, the matching algorithm might use an indication from historical data that advisors who play golf and have opposing scores on a particular personality test are likely to have successful relationships as the basis for matching some profiles. The matching algorithm may include a weighting feature that gives priority to data fields and/or associated values that a JA or SA finds particularly important. In some embodiments, the matching algorithm may use a location of the SA device 102 and/or the JA device 104, for example as provided by a GPS locator in the SA device 102 and/or the JA device 104 to prioritize matches based on proximity between the SA and the JA. Resulting from the matching algorithm(s), at step 216 the matching circuit 146 determines a matched pair, i.e., an SA and a JA that the matching circuit 146 predicts would make a successful business partnership.

Figure 7:
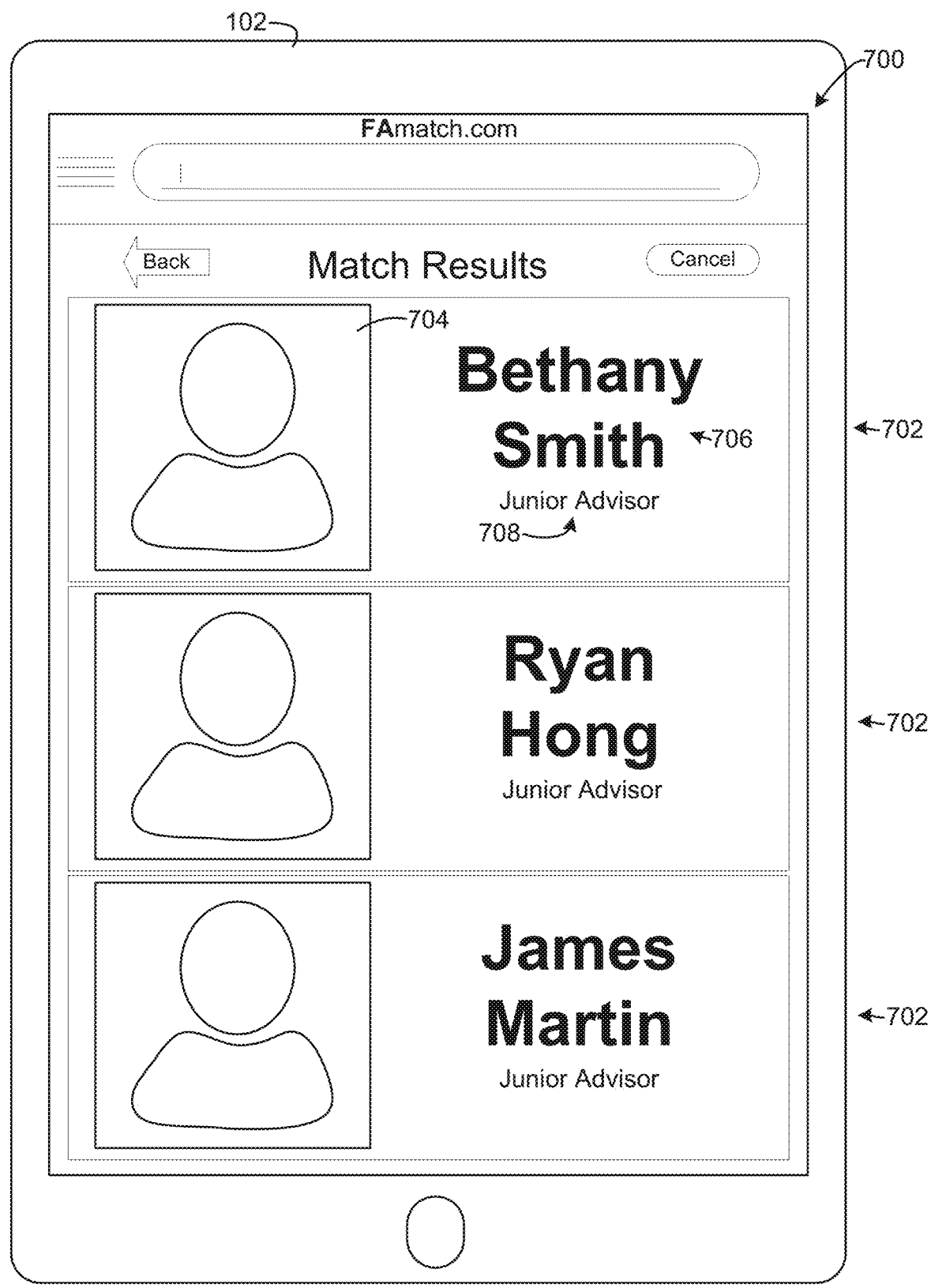
FIG. 7 is an illustration of a fourth view in a graphical user interface for SA-to-JA matching, according to an example embodiment.

Once a match pair is identified, the interface generation circuit 148 generates a graphical user interface for the SA that shows some or all of the JA profile information at step 218. The graphical user interface is transmitted to one or more SA devices 102. Examples embodiments of graphical user interfaces generated at step 218 are shown in FIGS. 6A-7. In some embodiments, the data fields included on the graphical user interface are selected to help minimize bias and discrimination, for example by showing work and educational experience while hiding names, genders, ages, etc. At step 220, an option to approve or decline the match is provided in the graphical user interface. The option can be selected by the SA (e.g., by clicking/touching a button, swiping a certain direction on a screen, otherwise indicating approval/denial) to indicate whether the SA agrees that the SA and the matched JA could make a good partnership. At step 222, the matching circuit 146 receives an indication of the SA's choice to accept or reject the match.

The interface generation circuit 148 also generates a graphical user interface for the JA from the matched pair that shows some or all of the SA profile information at step 224. The graphical user interface is transmitted to one or more JA devices 104. At step 226, an option to approve or decline the match is provided in the graphical user interface. The option can be selected by the JA (e.g., by clicking/touching a button, swiping a certain direction on a screen, otherwise indicating approval/denial) to indicate whether the JA agrees that the JA and the matched SA could make a good partnership. At step 228, the matching circuit 146 received an indication of the SA's choice to accept or reject the match.

At step 230, the matching circuit 146 asks whether both the SA and the JA in a matched pair accepted the match. If not (i.e., if either or both of the SA and the JA selected the option to decline the match), the process 200 returns to step 216 to determine a new matched pair to give the SA and the JA new matches. Steps 216-230 may thus be repeated for one party, for example a particular SA, until that party has accepted a match that was also accepted by the other party in the matched pair, or until all possible matches have been rejected.

If both the SA and the JA accept the match, at step 232 the provider computing system 106 facilitates communication between the SA and the JA. According to various embodiments, facilitating communication between the SA and the JA includes generating a graphical user interface to provide a chat session and hosting the chat session between the JA and SA, providing contact information to the SA and/or JA to allow the SA and/or JA to initiate communication via phone, email, etc., and/or scheduling an in-person meeting between the SA and JA. The matched SA and JA are thereby provided with a way to communicate to learn more about one another and lay the foundation for a potential business relationship.

Figure 3:
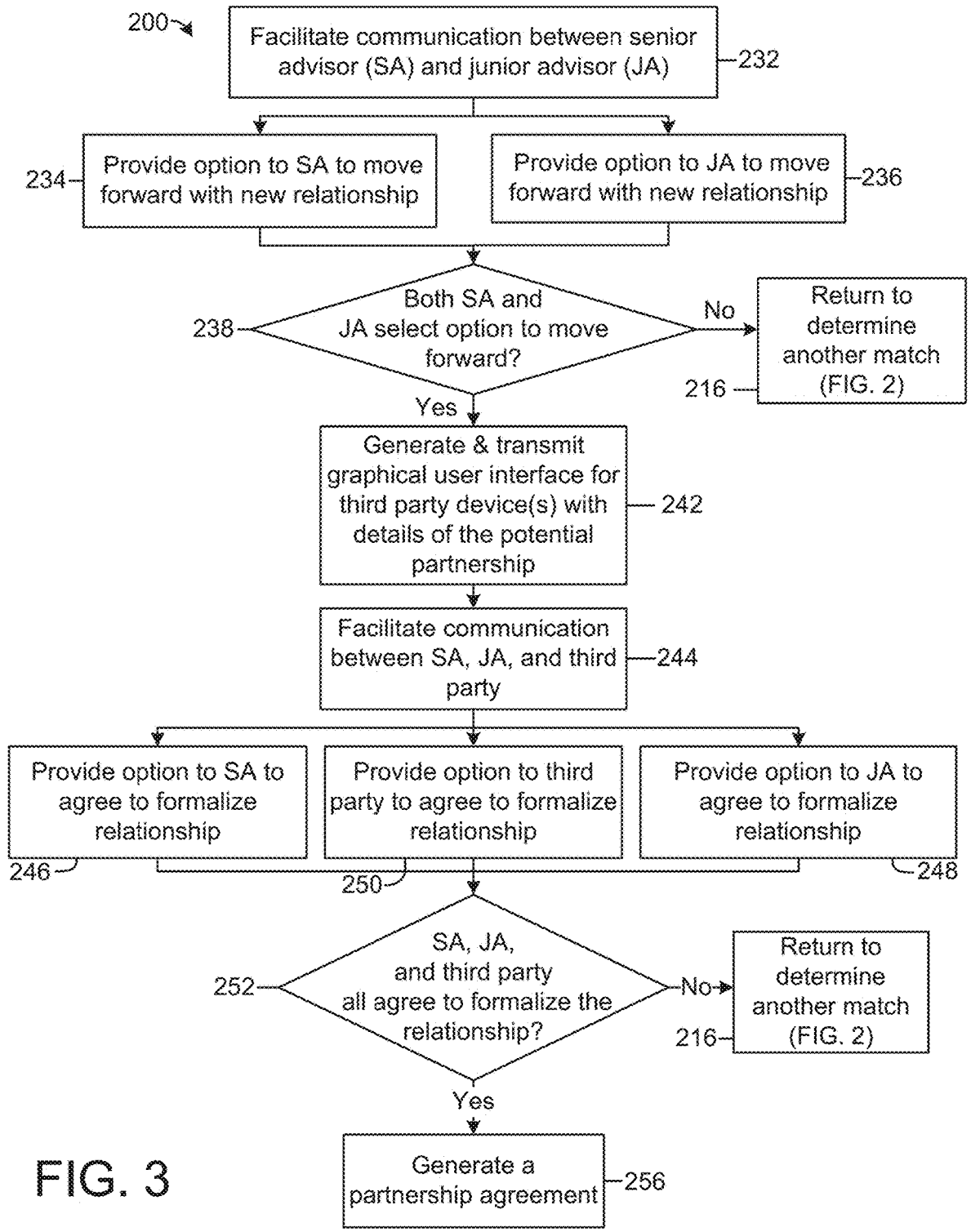
FIG. 3 is a flow chart of a second part of the process of FIG. 2 for initiating relationships between SAs and JAs with the system of FIG. 1, according to an example embodiment.

Referring now to FIG. 3, a second phase of the process 200 of FIG. 2 is shown, according to an exemplary embodiment. In general, the steps shown in FIG. 3 provide for the input of a third party into the matchmaking process.

After the provider computing system facilitates communication between the SA and the JA at step 232, at step 234 an option is provided to the SA to agree to move forward with the new relationship. At step 236, an option is also provided to the JA to agree to move forward with the new relationship. These options are provided as a part of graphical user interface generated by the interface generation circuit 148 and transmitted to the SA devices 102 and the JA devices 104. The graphical user interfaces may also include an option to indicate that the SA or JA does not want to move forward with a new relationship with the other member of the matched pair.

At step 238, the matching circuit 146 asks whether both the SA and the JA selected the option to move forward with the new relationship, i.e., whether both the SA and the JA affirmatively indicated that the initial communication went well and that a new relationship is desired. According to various arrangements, the matching circuit 146 may determine that one or both parties does not want to move forward based on an explicit selection to end the nascent relationship and/or the passage of a predetermined amount of time after initial communication without receiving an indication to move forward. When the matching circuit 146 determines that one or both of the SA and JA in the matched pair do not want to move forward with the new relationship, the process 200 returns to step 216 to determine another matched pair.

If both the SA and the JA indicate that they want to move forward with the new relationship, at step 242 a graphical user interface is generated that includes details of the potential partnership and is transmitted to one or more third party devices 108. An third party using the one or more third party devices 108 is thereby informed of the new relationship and can see profile information for both the SA and JA as well as any other relevant information. In some embodiments, the particular third party chosen for involvement is selected using a matching algorithm that determines a best third party from a group of third parties to work with the SA-JA pair. For example, a third party may be selected based on expertise in particular kinds of partnerships or for other reasons such as a personality that fits well with the SA and JA. In a scenario where the SA and the JA are within the same wealth management business, the third party may also work for the wealth management business.

At step 244, the provider computing system 106 facilitates communication between the SA, the JA, and the third party. According to various embodiments, facilitating communication includes hosting a chat session or video conference, providing contact information to allow for communication via other channels (e.g. phone calls, emails), and/or scheduling in-person meetings between the SA, the JA, and the third party. The third party is thus provided with an opportunity to coach the SA and JA on new relationship formation, manage a conversation about the scope, terms, and goals of the new partnership, evaluate whether the proposed partnership is likely to be successful, and spot any other issues.

At step 246, the SA is provided with an option to agree to formalize the new relationship with the JA, for example via a graphical user interface presented on an SA device 102 and generated by the interface generation circuit 148. At step 248, the JA is also provided with an option to agree to formalize the new relationship with the SA, for example via a graphical user interface presented on a JA device 104 and generated by the interface generation circuit 148. At step 250, the third party is also provided with provided with an option to agree to the formalization of the new relationship between the SA and the JA, for example via a graphical user interface presented on a third party device 108 and generated by the interface generation circuit 148. The third party is thereby given the ability to approve or veto the new relationship using third party device 108. An indication of acceptance is transmitted from a device (i.e., the SA device 102, the JA device 104, or the third party device 108) to the provider computing system 106 when the option to agree to formalize the new relationship is selected on the device.

At step 252, the matching circuit 146 checks if the SA, the JA, and the third party all accepted the option to agree to formalize the relationship. The matching circuit 146 may determine that not all accepted the option based on either an affirmative indication of disapproval from the SA made via SA device 102, from the JA made via JA device 104, or from the third party made via third party device 108, or the passage of a preset duration of time after the options to agree to formalize the relationship were provided. If the matching circuit determines that one or more party does not agree to formalize the relationship, the process 200 returns to step 216 to determine another match.

If the matching circuit 146 determines that the SA, the JA, and the third party all agree to formalize the relationship, at step 256 the matching circuit 146 generates a partnership agreement. The partnership agreement is a contractual instrument that can be used to establish a binding, formalized partnership or other business relationship between the SA and the JA. The matching circuit 146 may use profile information from the profile database 144, input from the third party, and other data to tailor the partnership agreement to the particular SA and JA. In some embodiments, the matching circuit 146 monitors and analyzes communication between the SA and JA facilitated by the provider computing system 106 to automatically capture the terms of the business arrangement discussed by the SA and the JA, for example using natural language processing to determine one or more terms of an agreement between the SA and JA. The matching circuit 146 may then incorporate such terms in the partnership agreement. The partnership agreement may be provided on a graphical user interface generated by the interface generation circuit 148 and transmitted to one or more JA devices 104, SA devices 102, and third party devices 106. The graphical user interface may be configured to prompt and receive an electronic signature from the JA via a JA device 104 and from the SA via an SA device 102. The provider computing system 106 may store an authenticated record of the electronic signatures (e.g., time, date, IP address, other proof of the identity of the signer of the agreement). The provider computing system 106 thereby facilitates the creation of a formal relationship between an SA and a JA.

Figure 4:
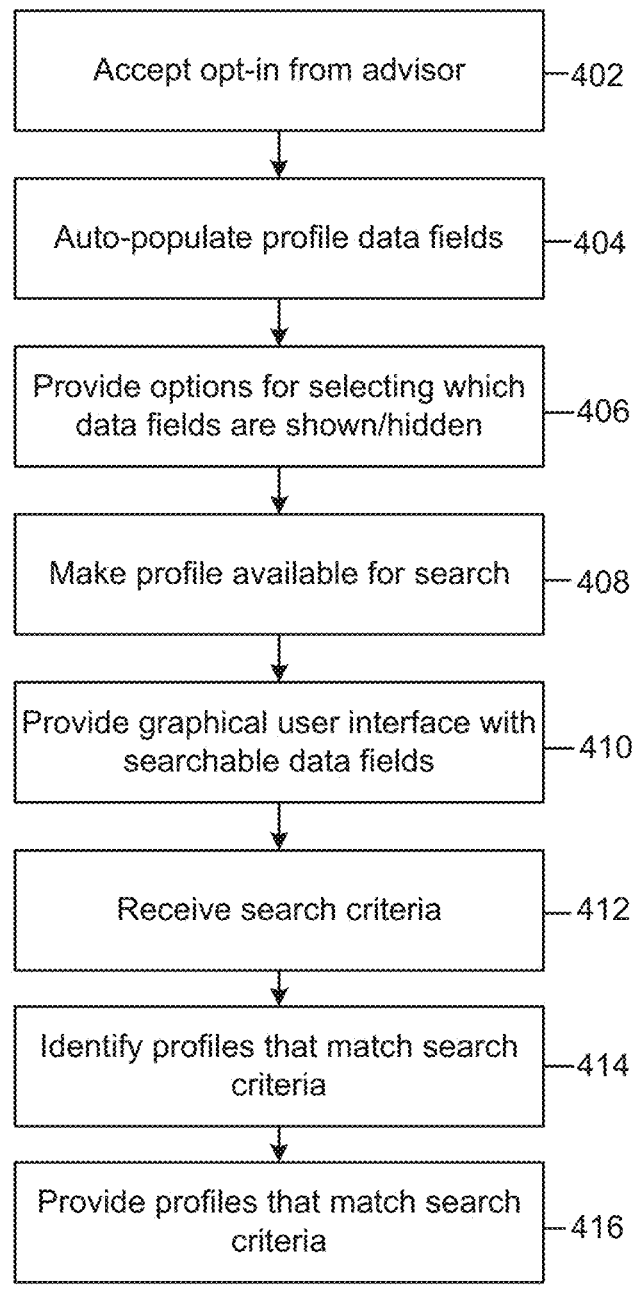
FIG. 4 is a flow chart of a process for populating and operating a search tool relating to SAs and JAs, according to an example embodiment.

Referring now to FIG. 4, a flow chart of a process 400 for teambuilding for advisors (FAs) is shown, according to an exemplary embodiment. Process 400 can be carried out by the provider computer system 106 of FIG. 1.

At step 402, the provider computing system 106 accepts an opt-in from a FA. In some embodiments, the opt-in is prompted by a graphical user interface generated by the interface generation circuit 148 and transmitted to an SA device 102 or JA device 104. The opt-in is provided via input/output circuit 114 of an SA device 102 or via input/output circuit 124 of a JA device 104 and transmitted to the provider computing system 106 via network 109.

At step 404, the provider computing system 106 creates a profile for the FA by auto-populating profile data fields with the values for that FA. The provider computing system 106 accesses one or more computing systems associated with the FA's wealth management business (e.g., personnel records, client management systems, asset management systems) and pulls information to fill data fields that characterize the FA. The provider computing system 106 thereby automatically generates a profile for the FA that includes information such as the FA's time in the wealth management business, the FA's education, the FA's branch location, the FA's contact information, the FA's assets under management, the FA's number of clients, and other information. The profile (i.e., a value for each of a plurality of data fields) for the FA is stored in the profile database 144.

At step 406, options for selecting which data fields are shown or hidden in the FA's profile are provided to the FA. A graphical user interface that includes the options, for example as shown in FIG. 9 and described in detail with reference thereto, is generated by the interface generation circuit 148 and transmitted to the FA's device (i.e., one of SA devices 102 or JA devices 104). For example, the graphical user interface may include checkboxes that can be selected or deselected to selectively include or not include a data field as a part of the FA's viewable and searchable profile. At step 408, the profile is made available for searching and viewing by other FAs who opt-in to the system. The available profile includes the data fields selected to be display as a part of the FA's profile.

At step 410, a graphical user interface that includes searchable data fields is provided to FAs, for example as generated by the interface generation circuit 148 and transmitted to SA devices 102 and/or JA devices 104. This graphical user interface allows a FA to select a value or a set of values for any number of the data fields as search criteria. For example, an FA may use the graphical user interface to input search criteria for an FA in the state of Michigan, with assets under management between fifty million and one hundred million dollars, and with over forty years of experience in wealth management. These search criteria can be input via SA devices 102 and JA devices 104 and are then transmitted to the provider computing system 106 via network 109.

At step 412, the provider computing system receives the search criteria from the SA device 102 or the JA device 104. The search criteria are used by the matching circuit 146 to identify profiles that match the search criteria at step 414. That is, profiles with values that match the values of the search criteria for the searched data fields are identified. For example, if the search criteria indicate that an FA is looking for an FA in Michigan, with assets under management between fifty million and one hundred million dollars, and with over forty years of experience in wealth management, the matching circuit 146 identifies all profiles in the profile database 144 that include an indication that the corresponding FA is in Michigan, has assets under management between fifty million and one hundred million dollars, and has over forty years of experience in wealth management.

At step 416, the profiles identified as matching the search criteria are provided to the FA who entered the search criteria. The identified profiles may be included on a graphical user interface generated by the interface generation circuit 148 and transmitted via network 109 to the SA device 102 or JA device 104 used to initiate the search. The profiles may be presented in any format (e.g., in a list, in a graphical visualization). The profile of an FA includes all data fields that FA selected to include as part of the FA's profile. The provider computing system 106 thereby provides for the searching of FA data to identify FA's with traits of interest, which may be useful for building partnerships or teams of FAs for business development or succession planning purposes.

Referring now to FIG. 5, an example graphical user interface 500 for SA profile creation on a SA device 102 is shown, according to an exemplary embodiment. In general, graphical user interface 500 prompts an SA to input profile information for inclusion in the profile database 144. While the graphical user interface 500 shows an interface for SA profile creation, an analogous interface for JA profile creation is also contemplated by the present disclosure.

Graphical user interface 500 includes a photo box 502 with a edit photo button 504. The photo box 502 is configured to show a profile photo for the SA. The profile photo may be a picture of the SA or some other photo that the SA choses to represent the SA. To add a photo to the SA's profile or to edit an existing photo, the SA selects the edit photo button 504. Selecting the edit photo button 504 causes the graphical user interface 500 to launch a portal configured to allow the SA to upload a photo from the user device, import a photo from a social media website or an external file storage platform, or take a new photo using a camera of the SA device 102.

Graphical user interface 500 also includes various data fields 506 that prompt the SA to enter various values that describe corresponding facts about the SA. As shown in FIG. 5, graphical user interface 500 provides drop-down menus 508 and free-text-entry boxes 510 to facilitate the entry of values corresponding to the data fields 506. For example, an SA may select the drop-down menu 508 next to "Time in Industry" to select a number of years from a list of years. As another example, the SA may tap on the free-text-entry box 510 next to "Hometown" to cause the graphical user interface 500 to launch a graphical keyboard that the SA can use to enter letters and/or other characters that spell the name of the SA's hometown. Other embodiments include various other input modes, including slider bars to select a value from a range of values, date pickers, etc. The information input via graphical user interface 500 is transmitted via network 109 to the provider computing system 106 and stored in the profile database 144.

Graphical user interface 500 also includes a next button 512 which can be selected to move on to the next screen, for example to graphical user interface 600 of FIG. 6A described in detail below. In some embodiments, the graphical user interface 500 prevents the SA from selecting the next button 512 until the SA enters a value for all data fields 506 or for a subset of the data fields 506. The graphical user interface 500 can thereby require the SA to input sufficient information for the matching functions of the provider computing system 106 to operate successfully.

Referring now to FIG. 6A, a graphical user interface 600 is shown that prompts an SA or JA to input criteria for what the SA or JA is looking for in a match. Graphical user interface 600 may be presented on an SA device 102 and/or a JA device 104. Graphical user interface 600 includes data fields 602 that prompt the entry of values corresponding to characteristics of desired matches. For example, for the data field "Time in Industry," a JA may use drop-down menu 604 to choose a high number indicating that a good match for the JA is an experienced SA, while an SA can use drop-down menu 604 to choose a low number to indicate a desire to match with a less-experienced JA that the SA can mentor and develop for succession planning purposes. Free-text entry boxes 606 provide another input field for a user to supply profile information. The information input via graphical user interface 600 is transmitted via network 109 to the provider computing system 106 and stored in the profile database 144.

Referring now to FIG. 6B, a graphical user interface 650 is shown prompting a user to select weights for each type of data. Slider bars 652 allow an SA or JA to indicate the importance of each factor to the SA or JA in determining a match, for example by selecting a position on a slider bar 652 further to the right to indicate higher importance and further to the left to indicate lower importance. The weights $w_i$ of the equation compatibility score=$1/N\Sigma_{i=1}^{N} w_i X_i$ described above may be determined based on the user selection of positions on the slider bars 652.

Referring now to FIG. 7, a graphical user interface 700 is shown that includes match results for an SA, according to an example embodiment. Graphical user interface 700 is presented on SA device 102. Graphical user interface 700 includes multiple JA match results 702. Each JA match result 702 includes a profile photo 704, a JA name 706, and a JA job title 708. Each JA match result 702 is configured to be selected by an SA to receive more information about the corresponding JA, for example by causing the graphical user interface 700 to navigate to the graphical user interface 800 shown in FIG. 8.

Figure 8:
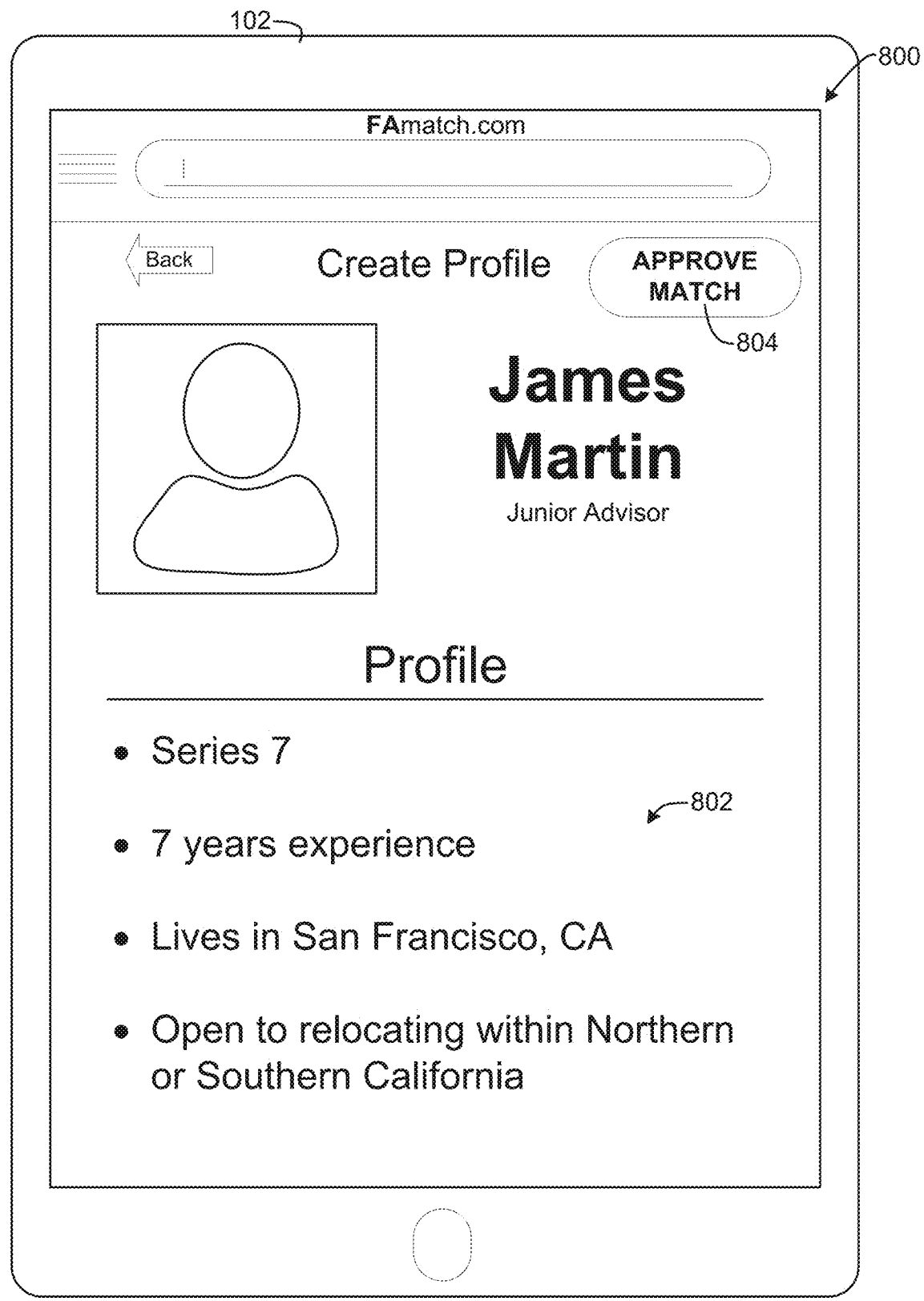
FIG. 8 is an illustration of a fifth view in a graphical user interface for SA-to-JA matching, according to an example embodiment.

Referring now to FIG. 8, a graphical user interface 800 that includes JA profile information 802 and an approve match button 804 is shown, according to an example embodiment. Profile information 802 is sourced from the profile database 144. Graphical user interface 800 is provided on an SA device 102. The approve match button 804 is configured to allow the SA to select the approve match button 804 to approve the match (i.e., to indicate that the SA is willing to match with the JA corresponding to JA profile information 802). When an SA selects the approve match button 804, the SA device 102 transmits an indication that the match is approved to the provider computing system 106. Back button 806 allows the SA to navigate back to graphical user interface 700 to view other matches.

Referring now to FIG. 9, a graphical user interface 900 for profile building is shown, according to an exemplary embodiment. Graphical user interface 900 may be generated by the interface generation circuit 148 and transmitted to SA devices 102 and/or JA devices 104 via network 109. Graphical user interface 900 includes a list of data fields 902, values 904 corresponding to those data fields, and display selectors 906.

Graphical user interface 900 corresponds at least to step 406 of process 400 shown in FIG. 4, where options are provided for selecting which data fields should be shown or hidden. As discussed with reference to FIG. 4 above, values 904 are auto-populated in the profile database 144 and in the graphical user interface 900 by pulling or receiving data from one or more other computing systems, such as a personnel records database of a wealth management company or a client management server. In the embodiment shown in FIG. 9, data fields 902 that are objective (e.g., "Industry Length of Service", "State", "Licensed") are auto-populated with values 904. The graphical user interface 900 prevents the user from editing the auto-populated values 904. Data fields 902 that are subjective (e.g., "Roles within your practice that you enjoy the most") are populated manually by a user by selecting values from drop down menus 908.

Display selectors 906 allow the FA to select which data fields 902 are displayed as part of a profile of the FA. For example, as shown in FIG. 9, the display selector 906 corresponding to the data field 902 "Branch" is checked, indicating that the branch "Bay City" will be included as part of the FA's profile. The display selector 906 corresponding to the data field "Professional Designations" is unchecked, indicating that the FA's professional designations will not be included in a profile of the FA. In some embodiments, the graphical user interface 900 prevents the FA from deselecting (i.e., choosing to hide) particular data fields 902, for example as indicated by the lack of a display selector 906 corresponding to data fields "Email Address" and "State" in FIG. 9. Graphical user interface 900 thereby allows a FA to customize the content of the FA's profile without requiring the FA to input values for multiple data fields by allowing the user to choose which auto-populated data fields are included in the FA's profile. Graphical user interface 900 and associated processes are therefore configured to reduce the burden on the FA and on the FA's device in setting up a new profile and in maintaining the accuracy of values 904.

Graphical user interface 900 further includes preview button 910, save button 912, and opt-in button 914. Preview button 910 can be selected by a FA to view the version of the FA's profile as would be seen by other users given the current selection/deselection of display selectors 906. Save button 912 allows a FA to cause the current selection/deselection of display selectors 906 to be stored in the profile database 144. Opt-in button 914 allows a FA to cause the current selection/deselection of display selectors 906 to be stored in the profile database 144 and to agree to have the FA's profile made available to other FAs for searching, matching, and viewing.

The embodiments described herein have been described with reference to drawings. The drawings illustrate certain details of specific embodiments that implement the systems, methods and programs described herein. However, describing the embodiments with drawings should not be construed as imposing on the disclosure any limitations present in the drawings.

It should be understood that no claim element herein is to be construed under the provisions of 35 U.S.C. § 112(f), unless the element is expressly recited using the phrase "means for."

As used herein, in various embodiments, the term "circuit" includes hardware structured to execute the functions described herein. In some embodiments, each respective "circuit" includes machine-readable media for configuring the hardware to execute the functions described herein. The circuit is embodied as one or more circuitry components including, but not limited to, processing circuitry, network interfaces, peripheral devices, input devices, output devices, sensors, etc. In some embodiments, a circuit takes the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" includes any type of component for accomplishing or facilitating achievement of the operations described herein. In one example, a circuit as described herein includes one or more transistors, logic gates (e.g., NAND, AND, NOR, OR, XOR, NOT, or XNOR), resistors, multiplexers, registers, capacitors, inductors, diodes, wiring, and so on.

In other embodiments, the "circuit" includes one or more processors communicably coupled to one or more memories or memory devices. In this regard, the one or more processors execute instructions stored in the memory or execute instructions otherwise accessible to the one or more processors. In various arrangements, the one or more processors are embodied in various ways and are constructed in a manner sufficient to perform at least the operations described herein. In some embodiments, the one or more processors are shared by multiple circuits (e.g., circuit A and circuit B comprise or otherwise share the same processor which, in some example embodiments, executes instructions stored, or otherwise accessed, via different areas of memory). Additionally, in various arrangements, a given circuit or components thereof (e.g., the one or more processors) are disposed locally (e.g., as part of a local server or a local computing system) or remotely (e.g., as part of a remote server such as a cloud based server). To that end, in certain arrangements, a "circuit" as described herein includes components that are distributed across one or more locations.

As used herein, a processor is implemented as a general-purpose processor, an application specific integrated circuit (ASIC), one or more field programmable gate arrays (FPGAs), a digital signal processor (DSP), a group of processing components, or other suitable electronic processing components. Additionally, in some arrangements, a "processor," as used herein, is implemented as one or more processors. In certain embodiments, the one or more processors are structured to perform or otherwise execute certain operations independent of one or more co-processors. In other example embodiments, two or more processors are coupled via a bus to enable independent, parallel, pipelined, or multi-threaded instruction execution. In some arrangements, the one or more processors take the form of a single core processor, multi-core processor (e.g., a dual core processor, triple core processor, or quad core processor), microprocessor, etc. In some embodiments, the one or more processors are external to the apparatus, for example, the one or more processors are a remote processor (e.g., a cloud based processor). Alternatively, or additionally, the one or more processors are internal and/or local to the apparatus. Accordingly, an exemplary system for implementing the overall system or portions of the embodiments might include a general purpose computing computers in the form of computers, including a processing unit, a system memory, and a system bus that couples various system components including the system memory to the processing unit.

Additionally, as used herein, a memory includes one or more memory devices including non-transient volatile storage media, non-volatile storage media, non-transitory storage media (e.g., one or more volatile and/or non-volatile memories), etc. In some embodiments, the non-volatile media takes the form of ROM, flash memory (e.g., flash memory such as NAND, 3D NAND, NOR, or 3D NOR), EEPROM, MRAM, magnetic storage, hard discs, optical discs, etc. In some embodiments, the volatile storage media takes the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. In various arrangements, each respective memory device is operable to maintain or otherwise store information relating to the operations performed by one or more associated circuits, including processor instructions and related data (e.g., database components, object code components, or script components), in accordance with the example embodiments described herein.

It should be understood that a "network interface," as used herein, includes any of a cellular transceiver (Code Division Multiple Access (CDMA), Global System for Mobile Communications (GSM), Long-Term Evolution (LTE), etc.), a wireless network transceiver (e.g., 802.11X, ZigBee, or Bluetooth), or a combination thereof (e.g., both a cellular transceiver and a Bluetooth transceiver). In some arrangements, a network interface includes hardware and machine-readable media sufficient to support communication over multiple channels of data communication. Further, in some arrangements, the network interface includes cryptography capabilities to establish a secure or relatively secure communication session between the device including the network interface and other devices of the system 100 via the network 110. In this regard, data is encrypted and transmitted to prevent or substantially prevent the threat of hacking.

In certain embodiments, an "input/output circuit" as used herein includes hardware and associated logics configured to enable a party to exchange information with a computing device to which the input/output circuit is connected. In various embodiments, an input aspect of an input/output circuit allows a user to provide information to the computing device and includes, for example, a touchscreen, a mouse, a keypad, a camera, a scanner, a fingerprint scanner, an eye scanner, a sensor that detects movement, a microphone, a joystick, a user input device engageable to the computing device via a USB, wirelessly, and so on, or any other type of input device capable of being used with a computing device. In various embodiments, an output aspect of an input/output circuit allows a party to receive information from the computing device and includes, for example, a display, a printer, a speaker, illuminating icons, LEDs, an output device engageable to the computing device via a USB, wirelessly, and so on, or any other type of output device capable of being used with a computing device.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein show a specific order and composition of method steps, it is understood that in various embodiments the order of these steps differs from what is depicted. As an example, two or more steps are performed concurrently or with partial concurrence. Also, in various embodiments, some method steps that are performed as discrete steps are combined, steps being performed as a combined step are separated into discrete steps, the sequence of certain processes is reversed or otherwise varied, and/or the nature or number of discrete processes is altered or varied. Furthermore, the order or sequence of any element or apparatus is varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques, with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or as acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions can be made to the design, operating conditions and arrangement of the embodiments without departing from the scope of the present disclosure as expressed in the appended claims.

What is claimed is:

1. A system, comprising:
   a network interface coupled to a network;
   a profile database coupled to the network interface and configured to store profile information relating to a plurality of users; and
   at least one processing circuit coupled to the profile database and the network interface, the at least one processing circuit configured to:
      receive, via the network interface, search criteria from a first device associated with a first user from the plurality of users;
      cause profile information relating to one or more other users based on the search criteria to be transmitted to the first device via the network interface;
      receive, via the network interface, an indication of a selection of a user of the one or more other users from the first device associated with the first user;
      monitor and analyze communications between a second device associated with the selected user and the first device associated with the first user; and
      transmit a message to at least one of the first device or the second device regarding the analyzed communications.

2. The system of claim 1, wherein the at least one processing circuit is further configured to:
   compare profile information relating to the first user to profile information relating to the plurality of users; and
   determine the profile information relating to the one or more other users to be transmitted to the first device based at least in part on historical data relating to other users and the search criteria.

3. The system of claim 2, wherein the profile information includes one or more of common client traits, categories of work performed, a quantity of experience, a number of clients, or a revenue value.

4. The system of claim 2, wherein the historical data comprises monitored and analyzed communications between users having a relationship.

5. The system of claim 1, wherein the at least one processing circuit is further configured to generate a first graphical user interface including a searchable data field and cause the first device to display the first graphical user interface, the first graphical user interface configured to receive the search criteria in the searchable data field.

6. The system of claim 5, wherein the at least one processing circuit is further configured to generate a second graphical user interface including a list of the one or more other users and corresponding profile information of the one or more other users, wherein the at least one processing circuit is further configured to cause the first device to display the second graphical user interface.

7. The system of claim 5, wherein the at least one processing circuit is further configured to generate a second graphical user interface having a data field that allows the first user to enter a prioritization value for each piece of entered search criteria.

8. The system of claim 1, wherein the profile database is configured to store profile information corresponding to a plurality of third parties; and
   wherein the at least one processing circuit is further configured to:
      determine a matched third party from the plurality of third parties based on the profile information;
      provide profile information corresponding to the first user and the selected user to a device associated with the matched third party; and
      facilitate communication between the matched third party, the first user, and the selected user.

9. A user device, comprising:
   a network interface communicable with a network; and
   at least one processing circuit comprising at least one processor and at least one memory, the at least one memory structured to store instructions that are executable by the at least one processor to:
      provide, via a display of the user device, a first graphical user interface having a searchable data field that allows a first user to enter search criteria;
      provide, via the display, a second graphical user interface having a data field that allows the first user to enter a prioritization value for each piece of entered search criteria;
      in response to receiving the entered search criteria and the prioritization values, transmit, via the network interface, the search criteria and the prioritization values to a provider computing system;
      receive, via the network interface, profile information relating to one or more other users from the provider computing system based on the search criteria and the prioritization values; and
      provide, via the display, the profile information relating to the one or more other users to the first user via at least one additional graphical user interface on the display.

10. The user device of claim 9, wherein the instructions are further executable by the at least one processor to set a lower maximum prioritization value associated with a first piece of search criteria than a maximum prioritization value associated with a second piece of search criteria.

11. The user device of claim 10, wherein the first piece of search criteria comprises an interest, hobby, or location associated with a particular group, and the second piece of search criteria comprises information other than the interest, hobby, or location associated with the particular group.

12. The user device of claim 9, wherein the instructions are further executable by the at least one processor to override and increase an entered prioritization value associated with a first piece of search criteria to decrease a relative prioritization value of a second piece of search criteria.

13. The user device of claim 9, wherein the instructions are further executable by the at least one processor to:
   receive, via the display, a selection of a second user from the one or more other users; and
   in response to receiving the selection of the second user, provide, via the display, a third user interface comprising profile information relating to the second user, the profile information comprising information corresponding to the search criteria.

14. The user device of claim 9, wherein the profile information relating to the one or more other users received from the provider computing system is further based on historical data comprising monitored and analyzed communications between users having a relationship.

15. The user device of claim 9, wherein the instructions are further executable by the at least one processing circuit to:
receive, via the display, an indication of a selection of a second user of the one or more other users; and
receive, via the network interface, a message based on monitored and analyzed communications between a second device associated with the second user and the user device.

16. A method, comprising:
providing, via a display of a user device associated with a first user, a first graphical user interface having a searchable data field that allows the first user to enter search criteria;
providing, via the display, a second graphical user interface having a searchable data field that allows the first user to enter a prioritization value for each piece of entered search criteria;
in response to receiving the entered search criteria and the prioritization values, transmitting the search criteria and the prioritization values to a provider computing system;
receiving profile information relating to one or more other users from the provider computing system based on the search criteria and the prioritization values; and
providing the profile information relating to the one or more other users to the first user via at least one additional graphical user interface on the display of the user device.

17. The method of claim 16, further comprising setting a lower maximum prioritization value associated with a first piece of search criteria than a maximum prioritization value associated with a second piece of search criteria, wherein the first piece of search criteria comprises an interest, hobby, or location associated with a particular group, and the second piece of search criteria comprises information other than the interest, hobby, or location associated with the particular group.

18. The method of claim 16, further comprising overriding and increasing an entered prioritization value associated with a first piece of search criteria to decrease a relative prioritization value of a second piece of search criteria.

19. The method of claim 16, wherein the profile information relating to the one or more other users received from the provider computing system is further based on historical data comprising monitored and analyzed communications between users having a relationship.

20. The method of claim 16, further comprising:
receiving, via the display, an indication of a selection of a second user of the one or more other users; and
receiving a message based on monitored and analyzed communications between a second device associated with the second user and the user device.

* * * * *